(12) United States Patent
Berlatzky et al.

(10) Patent No.: US 12,422,251 B2
(45) Date of Patent: Sep. 23, 2025

(54) SYSTEM AND METHOD FOR OPTICAL IMAGING AND MEASUREMENT OF OBJECTS

(71) Applicant: PXE Computational Imaging LTD, Kibbutz Beit Guvrin (IL)

(72) Inventors: Yoav Berlatzky, Kibbutz Beit Guvrin (IL); Yanir Hainick, Tel Aviv (IL)

(73) Assignee: PXE Computational Imaging LTD., Kibbutz Beit Guvrin (IL)

( * ) Notice: Subject to any disclaimer, the term of this patent is extended or adjusted under 35 U.S.C. 154(b) by 301 days.

(21) Appl. No.: 17/792,270

(22) PCT Filed: Jan. 13, 2021

(86) PCT No.: PCT/IL2021/050041
§ 371 (c)(1),
(2) Date: Jul. 12, 2022

(87) PCT Pub. No.: WO2021/144795
PCT Pub. Date: Jul. 22, 2021

(65) Prior Publication Data
US 2023/0029930 A1    Feb. 2, 2023

Related U.S. Application Data

(60) Provisional application No. 62/960,716, filed on Jan. 14, 2020.

(51) Int. Cl.
*G01B 11/16*    (2006.01)
*G01B 11/25*    (2006.01)
(Continued)

(52) U.S. Cl.
CPC ............ *G01B 11/167* (2013.01); *G01B 11/25* (2013.01); *G02B 27/48* (2013.01); *G06V 10/25* (2022.01);
(Continued)

(58) Field of Classification Search
CPC ..... G01B 11/16; G01B 11/161; G01B 11/162; G01B 11/167; G01B 11/24;
(Continued)

(56) References Cited

U.S. PATENT DOCUMENTS 3,804,521 A * 4/1974 Sprague ................. G02B 27/48
356/600
3,952,583 A    4/1976 Rosati
(Continued)

FOREIGN PATENT DOCUMENTS

CN    104394755 A    3/2015
CN    104736042 A    6/2015
(Continued)

OTHER PUBLICATIONS

Gonglewski , et al., "Coherent Image Synthesis From Wave-Front Sensor Measurements of a Nonimaged Laser Speckle Field: A Laboratory Demonstration", Optics Letters, Optical Society of America, US, vol. 16, No. 23. XP000234323, ISSN: 0146-9592, Dec. 1, 1991, pp. 1893-1895.
(Continued)

*Primary Examiner* — Gordon J Stock, Jr.
(74) *Attorney, Agent, or Firm* — Ballard Spahr LLP

(57) ABSTRACT

There are provided systems and methods for imaging, measuring an object, and characterizing a sample. An optical, speckle-based imaging system may comprise an illumination unit comprising at least one coherent light source to illuminate a sample; a collection unit for collecting input light from the sample, the collection unit consisting of an imaging optics and a wavefront imaging sensor; and a control unit coupled to the illumination unit and the collection unit for analyzing the input light and generating a speckle wavefront image, wherein the at least one coherent light source is to generate primary speckles in the sample or
(Continued)

thereon, and the imaging optics is to capture a secondary speckle pattern induced by the illumination unit in the sample or thereon.

18 Claims, 13 Drawing Sheets

(51) Int. Cl.
  *G02B 27/48* (2006.01)
  *G06V 10/25* (2022.01)
  *G06V 10/26* (2022.01)
  *G06V 40/16* (2022.01)
  *H04N 23/56* (2023.01)

(52) U.S. Cl.
  CPC ............ *G06V 10/26* (2022.01); *G06V 40/166* (2022.01); *G06V 40/167* (2022.01); *G06V 40/171* (2022.01); *G06V 40/172* (2022.01); *H04N 23/56* (2023.01)

(58) Field of Classification Search
  CPC . G01B 11/2441; G01B 11/25; G01B 11/2518; G01B 11/254; G02B 27/48; G06V 10/25; G06V 10/26; G06V 40/166; G06V 40/171; G06V 40/172; G06V 40/167; H04N 23/55; H04N 23/56; H04N 23/71; H04N 23/74
  See application file for complete search history.

(56) References Cited

U.S. PATENT DOCUMENTS

| | | | |
|---|---|---|---|
| 4,591,996 A | 5/1986 | Vachon | |
| 4,934,815 A * | 6/1990 | Tai | G01B 11/303 356/512 |
| 5,870,196 A * | 2/1999 | Lulli | G01B 9/02096 356/35.5 |
| 6,188,482 B1 | 2/2001 | Cloud | |
| 6,248,994 B1 * | 6/2001 | Rose | G01B 11/162 356/28 |
| 6,550,917 B1 | 4/2003 | Neal et al. | |
| 6,563,129 B1 | 5/2003 | Knobel | |
| 7,123,363 B2 | 10/2006 | Puttappa et al. | |
| 8,477,318 B2 | 7/2013 | Dillon et al. | |
| 8,638,991 B2 | 1/2014 | Zalevsky et al. | |
| 8,660,324 B2 * | 2/2014 | Byren | G06V 40/1312 356/511 |
| 8,780,182 B2 * | 7/2014 | Byren | G01B 9/02096 348/47 |
| 9,344,811 B2 | 5/2016 | Bakish | |
| 10,345,137 B2 | 7/2019 | Carmon | |
| 10,466,032 B2 | 11/2019 | Vikhagen | |
| 2002/0014533 A1 | 2/2002 | Zhu et al. | |
| 2003/0042303 A1 | 3/2003 | Tsikos et al. | |
| 2005/0243055 A1 | 11/2005 | Ranta et al. | |
| 2008/0304128 A1 * | 12/2008 | Busker | G02B 27/48 348/E9.026 |
| 2009/0033814 A1 * | 2/2009 | Khan | G02B 27/48 349/35 |
| 2009/0034037 A1 * | 2/2009 | Khan | H04N 9/3161 |
| 2010/0226543 A1 | 9/2010 | Zalevsky | |
| 2012/0188505 A1 * | 7/2012 | Copland | A61B 3/0025 351/205 |
| 2014/0148658 A1 | 5/2014 | Zalevsky et al. | |
| 2016/0338623 A1 | 11/2016 | Tholl et al. | |
| 2017/0209047 A1 | 7/2017 | Zalevsky et al. | |
| 2018/0372536 A1 * | 12/2018 | Carmon | B60N 2/0022 |
| 2019/0045112 A1 | 2/2019 | Ichiki et al. | |
| 2019/0162520 A1 | 5/2019 | Shaked et al. | |
| 2020/0397269 A1 * | 12/2020 | Miyata | G02B 27/48 |

FOREIGN PATENT DOCUMENTS

| | | |
|---|---|---|
| CN | 107169483 A | 9/2017 |
| CN | 108007677 A | 5/2018 |
| CN | 207650834 U | 7/2018 |
| CN | 109475293 A | 3/2019 |
| JP | 2016005525 A | 1/2016 |
| JP | 2017509373 A | 4/2017 |
| JP | 2019045289 A | 3/2019 |
| JP | 2019523393 A | 8/2019 |
| KR | 20180134280 A | 12/2018 |
| WO | 2019038128 A1 | 2/2019 |

OTHER PUBLICATIONS

Voelz, et al., "Coherent Image Synthesis Using a Shack-Hartmann Wavefront Sensor", SPIE vol. 1351 Digital Image Synthesis and Inverse Optics. XP040538518, Nov. 1, 1990, pp. 780-786.

* cited by examiner

Change in speckle wavefront on local patch on sample with deformation

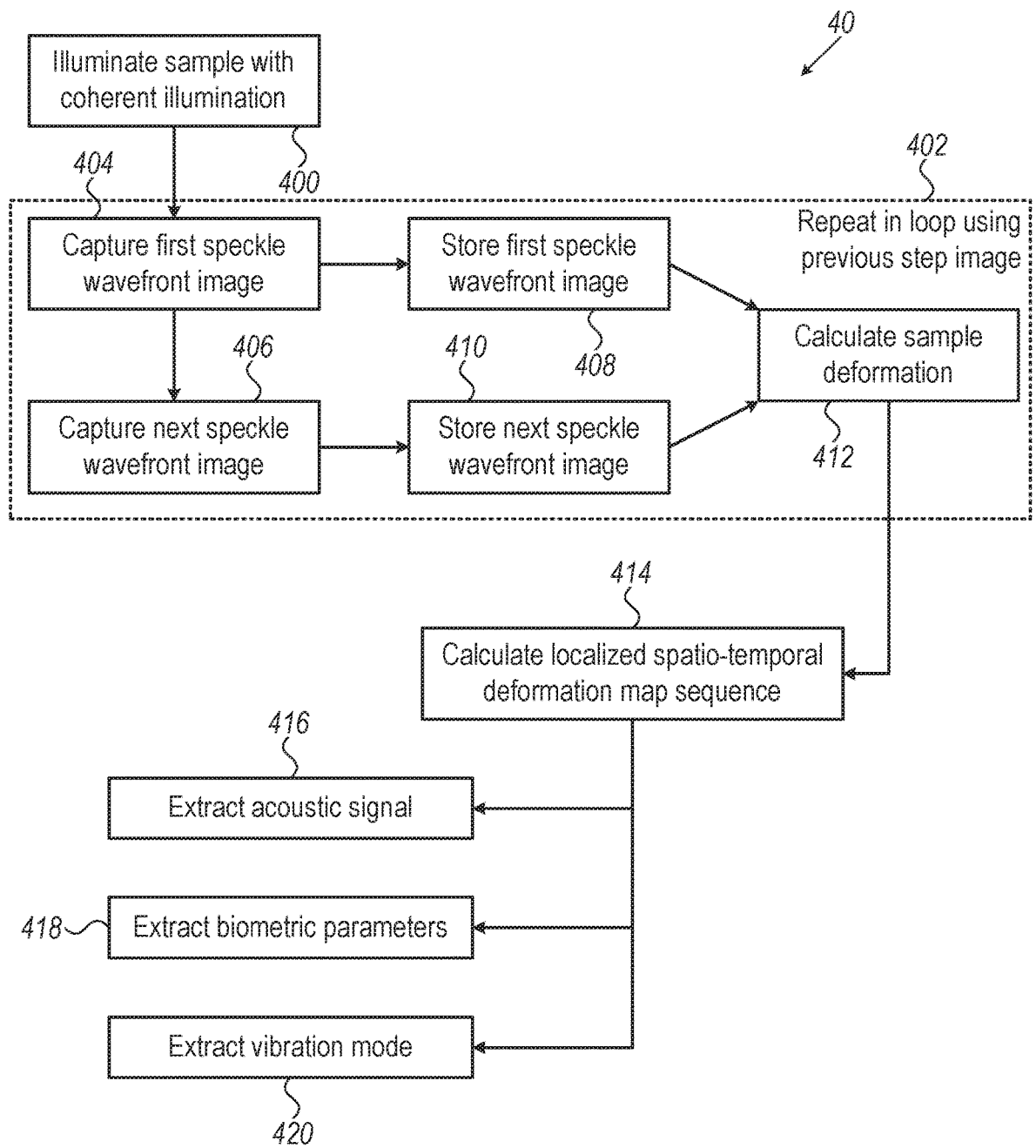

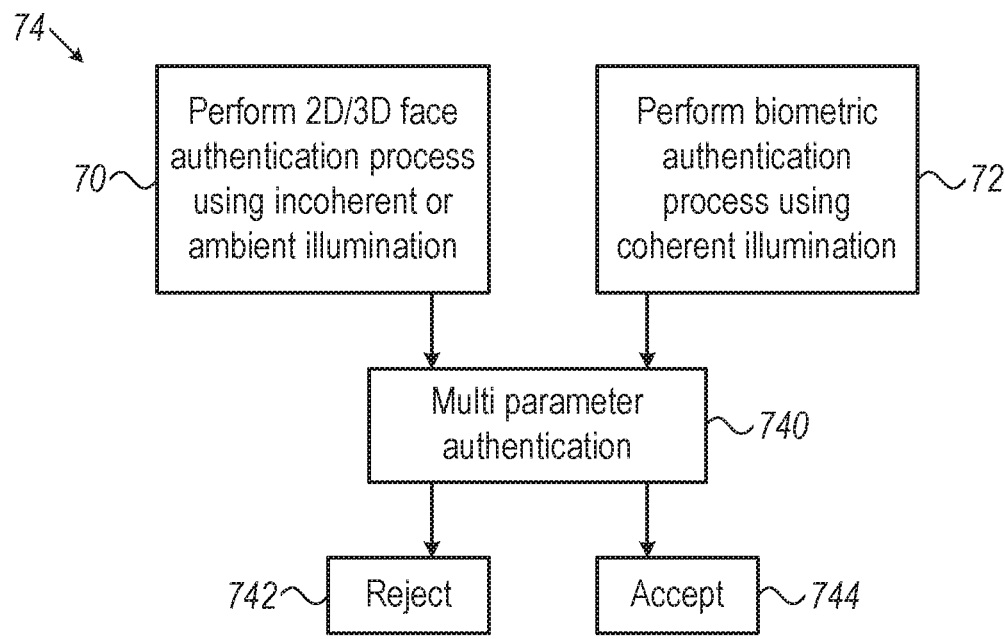
FIG. 7c
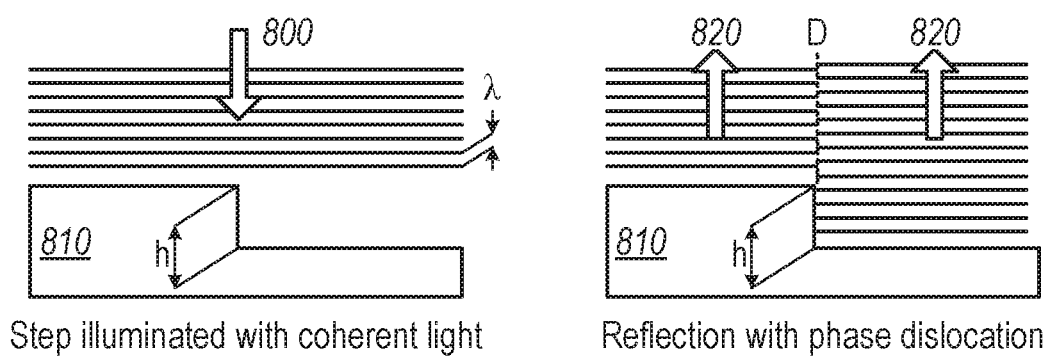
Step illuminated with coherent light
FIG. 8a
Reflection with phase dislocation
FIG. 8b

SYSTEM AND METHOD FOR OPTICAL IMAGING AND MEASUREMENT OF OBJECTS

CROSS REFERENCE TO RELATED APPLICATIONS

This application is a U.S. National Stage Application of PCT International Application No. PCT/IL2021/050041 filed on Jan. 13, 2021, which claims priority from U.S. provisional patent application 62/960,716, filed Jan. 14, 2020, all of which are incorporated herein by reference.

FIELD OF THE INVENTION

The present invention generally relates to optical imaging and measurements, and more specifically to optical imaging, measurements and characterization of objects and samples, and optical biometric measurements of people or animals.

BACKGROUND OF THE INVENTION

Optical speckle-based measurement is a method for non-contact measurement of objects and samples. Properties such as motion, orientation, vibration, and deformation can be measured. A variety of objects can be measured for a multitude of purposes. For example, mechanical components of an object can be measured for monitoring and characterization under stress in test or working conditions.

Biometric measurements are another example. Heart rate, blood pressure, breathing, and other parameters can be measured by performing a series of measurements on the relevant part of the body. Furthermore, acoustic signals can be recovered by measuring the vibration of either the sound source, e.g., a speaker, neck region of a human, or of adjacent objects that vibrate due to the acoustic signal.

There is a need in the art to improve sample coverage in various fields. There is a need in the art to enhance the sensitivity and robustness of imaging and measurements of various objects.

SUMMARY OF THE INVENTION

According to embodiments of the invention, there are provided systems and methods for imaging, measuring an object, and characterizing a sample.

According to an aspect of the invention, there is provided an optical, speckle-based imaging system comprising an illumination unit comprising at least one coherent light source to illuminate a sample; a collection unit for collecting input light from the sample, the collection unit consisting of an imaging optics and a wavefront imaging sensor; and a control unit coupled to the illumination unit and the collection unit for analyzing the input light and generating a speckle wavefront image, wherein the at least one coherent light source is to generate primary speckles in the sample or thereon, and the imaging optics is to capture a secondary speckle pattern induced by the illumination unit in the sample or thereon.

According to embodiments of the invention, there is provided an optical, speckle-based imaging system comprising an illumination unit comprising at least one coherent light source to illuminate a sample; a collection unit for collecting input light from the sample, the collection unit consisting of an imaging optics and a wavefront imaging sensor; and a control unit coupled to the illumination unit and the collection unit for analyzing the input light and generating a speckle wavefront image, wherein a size of an exit pupil of the illumination unit is smaller than a size of an entrance pupil of the imaging optics and wherein the at least one coherent light source is to generate primary speckles in the sample or thereon, and the imaging optics is to capture a secondary speckle pattern induced by the illumination unit in the sample or thereon.

According to an embodiment of the invention, the control unit is further to affect at least one of the size of the exit pupil and the size of the entrance pupil, and a relationship therebetween.

The at least one coherent light source may have a temporal coherence length that is greater than at least one of (1) an optical diffusion length of the sample and (2) surface roughness of the sample.

The coherent light source may have a spatial coherence length, and the collection unit may have a spatial coherence length of a point-spread-function, and the spatial coherence length of the coherent light source, as projected onto the sample, is at the order of or greater than the spatial coherence length of the point-spread-function of the collection unit as projected through the imaging optics onto the sample.

The optical properties of the illumination unit and optical properties of the collection unit may be selected to form an angle subtended by an optical aperture of the collection unit as seen from an arbitrary point on the sample that is larger than an angle subtended by an optical aperture of the illumination unit as seen from the same point on the sample, for every point to be imaged on the sample.

The illumination unit may have an illumination aperture to subtend an illumination angle, and the collection unit may have a collection aperture to subtend a collection angle and wherein the control unit is further coupled to the illumination unit to affect the illumination conditions and is further to affect the collection condition to form a collection angle, as seen from an arbitrary point on the sample, that is larger than the illumination angle as seen from the same point on the sample, for every point on the sample to be imaged.

The collection unit may further measure data indicative of at least one of speckle intensity, speckle wavefront, and speckle coherence.

The illumination unit may further comprise an incoherent light source, and the control unit may further generate a light field image in response to incoherent illumination.

The control unit may operate the illumination unit to provide a coherent light and an incoherent light selectively.

The illumination unit may further comprise an incoherent light source, and the control unit may operate an aperture of the illumination unit so that a spatial coherence length of the incoherent illumination is shorter than a spatial coherence length of the imaging optics of the collection unit.

The wavefront imaging sensor may be one of a group consisting of: a plenoptic camera; a light field camera; a Shack-Hartmann wavefront sensor; and a coherence camera wavefront sensor comprising an encoder having a plurality of similar unit cells, and an array of sensor cells located at a distance downstream of said unit cells with respect to a general direction of propagation of input light through the wavefront imaging sensor, wherein the array of sensor cells defines a plurality of sub-array unit cells, each sub-array corresponding to a unit cell of said plurality of the unit cells of the encoder, and each sub-array comprising a predetermined number M of sensor elements, and wherein the encoder is to apply predetermined modulation to input light such that each unit cell of said encoder directs a portion of the input light incident thereon onto sub-array unit cell corresponding therewith and one or more neighboring sub-array unit cells within a predetermined proximity region, and wherein the predetermined number M is determined in accordance with a predetermined number of sub-arrays unit cells within the predetermined proximity region.

The illumination unit may provide at least one light of a group consisting of coherent light, partially coherent light, and incoherent light. The illumination unit may further provide light as a set of varying optical properties, the optical properties and conditions are from a group consisting of selected wavelength ranges, selected temporal coherence ranges, selected illumination directions; and the control unit may generate one or more of a group consisting of intensity map, wavefront map and coherence map.

According to an aspect of the invention, there is provided an imaging method comprising: Illuminating a sample with coherent light; capturing input light coming from the sample, by a collection unit consisting of an imaging optics and a wavefront imaging sensor; by a control unit coupled to the collection unit, analyzing the input light and generating a speckle wavefront image, wherein the at least one coherent light source is to generate primary speckles in the sample or thereon, and the imaging optics is to capture a secondary speckle pattern induced by the illumination unit in the sample or thereon. A size of an exit pupil of the illumination unit may be smaller than the size of an entrance pupil of the imaging optics. The control unit may affect at least one of the size of the exit pupil and the size of the entrance pupil, and a relation therebetween.

The method may comprise capturing and analyzing at least one additional input light coming from the sample and generating at least one additional speckle wavefront image, and calculating sample deformation based on the speckle wavefront image and the at least one additional speckle wavefront image.

The operation of calculating sample deformation may be performed by determining a change in local tilt between one or more pairs of speckle wavefront images.

The method may comprise calculating a time-sequence of spatio-temporal deformation maps.

The method may comprise at least one step of a group consisting of: analyzing the time-sequence of spatio-temporal deformation maps and picking out specific regions of interest in the sample; analyzing the time-sequence of spatio-temporal deformation maps and differentiating between the sample and sample surroundings; analyzing the time-sequence of spatio-temporal deformation maps and differentiating between the overall movement of the sample and local deformations or vibrations; analyzing the time-sequence of spatio-temporal deformation maps and performing spatial segmentation; analyzing the time-sequence of spatio-temporal deformation maps and performing temporal segmentation; analyzing the time-sequence of spatio-temporal deformation maps and extracting an acoustic signal; analyzing the time-sequence of spatio-temporal deformation maps and measuring biometric parameters; and analyzing the time-sequence of spatio-temporal deformation maps and mapping mechanical vibration modes.

The method may comprise illuminating a face, or part thereof, with at least one of a spatially incoherent light and ambient light; capturing incoherent wavefront image; calculating a two-dimensional (2D) intensity image and depth map; extracting unique three-dimensional (3D) facial recognition data; and comparing the facial recognition data with stored unique three-dimensional (3D) facial recognition data; and determining a recognition accept or reject decision.

The method may comprise analyzing the time-sequence of spatio-temporal deformation maps and extracting spatio-temporal biometric parameters; extracting unique biomarkers; comparing the unique biomarkers with stored unique biomarkers; and determining a recognition accept or reject decision.

The method may comprise repeating the operations of illuminating, capturing, analyzing and generating for a sequence of wavelengths; performing multi-spectral phase unwrapping; and estimating a surface profile.

The method may comprise, for a variety of angles, repeating the operations of illuminating, capturing, analyzing, and generating for a sequence of wavelengths and performing multi-spectral phase unwrapping; and calculating a three-dimensional diffractive tomography refractive index distribution.

BRIEF DESCRIPTION OF THE DRAWINGS

For a better understanding of the invention with regard to the embodiments thereof, reference is made to the accompanying drawings, in which like numerals designate corresponding entities throughout, and in which:

FIG. 4 is another flow diagram that illustrates a method according to an embodiment of the invention;

FIGS. 7a-7c are flow diagrams that illustrate methods according to an embodiment of invention;

FIGS. 8a-8b schematically illustrate coherent illumination at normal incidence in accordance with an embodiment of the invention;

DETAILED DESCRIPTION OF EMBODIMENTS

Figure 1:
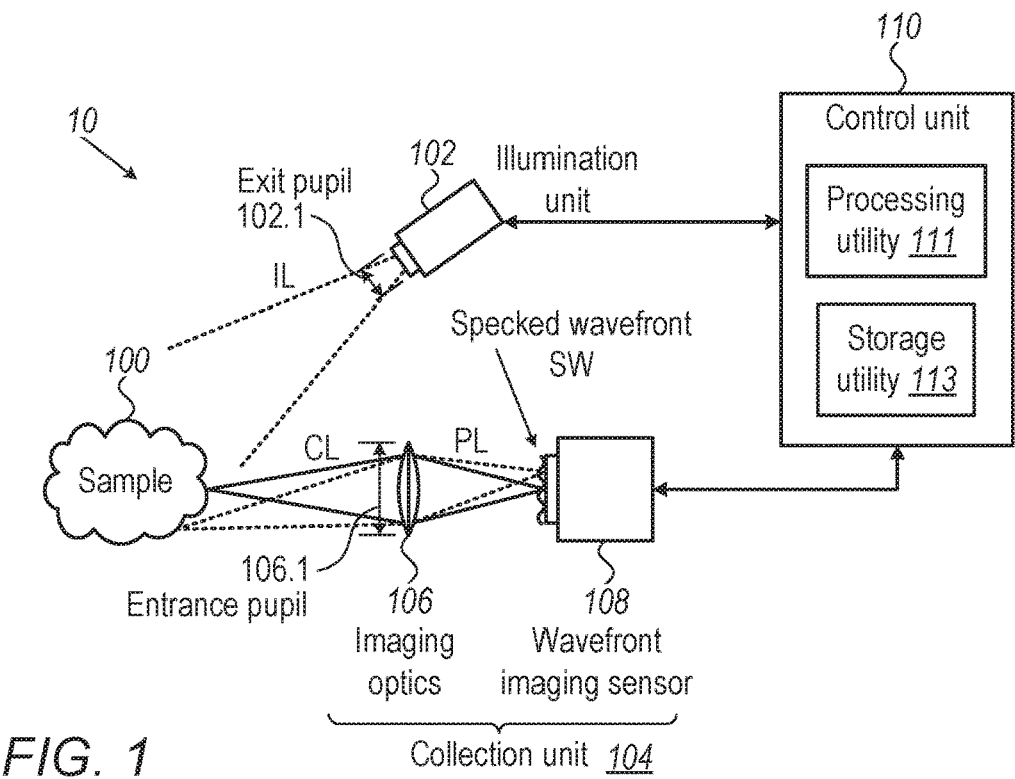
FIG. 1 is a block diagram that schematically illustrates a system according to an embodiment of the invention.

Optical measurements and characterization of objects and samples are used to determine and evaluate parameters such as transmittance, reflectivity, shape, depth, 3D structure, and texture. The change of the parameters over time can be measured to detect the changes in the sample's motion, orientation, deformation, and vibration. In some applications, these data may be used to characterize the sample for inspection and monitoring purposes. In other applications, these data may be used for biometric sampling, monitoring or authentication, as well as obtaining acoustic signals from the sample, such as speech.

Some optical measurements and techniques for the characterization of samples are speckle-based.

Current optical methods for speckle-based measurement of sample motion, orientation, vibration, and deformation are based on illuminating the sample with a coherent light source and collecting the scattered light. The speckle-based measurement may be done, for example, by (1) measuring an overall time-varying intensity distribution of light impinging on a photodetector; (2) direct imaging of the speckle intensity pattern; or (3) imaging of the speckle pattern on a focus plane displaced from the object.

Typically, speckle-based measurements include the sample's illumination with a single substantially coherent spot or with a multitude of distinct, coherent spots. In single-spot and multi-spot illumination, the surface of the sample is not entirely covered. Thus, a complete map of sample deformation or vibration cannot be measured. Object movement, deformation, and vibration are typically only be measured on certain regions of the sample.

Single-spot and multi-spot illumination measurements may not distinguish non-uniform deformation or vibration within each such distinct illumination spot. Instead, they treat the deformation or vibration within each distinct illumination spot as a whole. Thus, single-spot and multi-spot illumination measurements can only provide data indicative of the spatial average of the deformation or vibration within each distinct illumination spot. Put differently, there is no spatial resolution of the vibration or deformation map within each distinct illumination spot. This is especially true for imaging the speckle pattern on a focus plane displaced from the sample—spatial resolution on vibration or deformation is lost since the speckle pattern is imaged at strong defocus, yielding a far-field (Fourier plane) map of the speckle pattern.

Other measurement methods with broader coverage of the sample are based on using an interferometric setup with an additional reference beam or with several beams that illuminate the same region. These methods are generally known as electronic speckle pattern interferometry. The interferometric setup and multiple beams and optical paths may result in a measurement system that is very sensitive to the vibration of its components and extrinsic vibrations of the sample, and therefore less robust and subject to external environmental factors.

Other measurement methods may use special targets and reflectors that are attached to the sample. In such methods, data may only be collected from the regions of the sample where the targets or the reflectors are attached. In many practical use cases, the requirement to attach targets or reflectors to the sample is prohibitive. For example, attaching targets and reflectors to people or animals may cause discomfort; in other cases, the sample may not be disturbed, and more. Also, for very sensitive measurements, the motion of the sample may not be fully transferred to the target, yielding less than optimal results.

Furthermore, speckle-based measurements provide limited data on the sample's microscopic surface profile on opaque samples and almost no information on the interior of translucent samples. This is due to the large degree of roughness/diffusivity of the sample medium that gives rise to random speckle formation in the first place.

In addition, the above-mentioned methods typically perform non-imaging measurements and utilize specialized optical configurations that are not easily adapted to providing standard 2D (2d, 2-dimensional) images, nor performing 3D (3d, 3-dimensional) optical measurements. In order to obtain other information regarding the sample, such as overall reflectivity/transmittance and sample shape, a separate imaging setup is usually required for performing conventional 2D imaging. In addition, for 3D measurement, special equipment is required, using various techniques such as stereo imaging, structured light, laser triangulation, time of flight measurement, active stereo, and light-field imaging, to name a few.

Prior-art systems, known as "quantitative phase imaging" typically use an interferometric setup to obtain quantitative phase images of microscopic samples. Under the condition that the sample induces relatively small phase fluctuations, the resulting phase map has regular features relating to the sample's microscopic structure. Quantitative phase imaging systems, when used for imaging rough, diffusive, or macroscopic samples with large phase fluctuations, may provide a random speckle phase map. As such, a single speckle phase map provides little information regarding the sample, except perhaps a rough overall intensity distribution given by the local average speckle intensity.

Also, quantitative phase imaging typically requires that the illumination angle matches the orientation of the sample and of the imaging optics. This matching is required in order to capture the so-called "zero-order" transmission or specular reflection, i.e., a "brightfield" setup. On the other hand, the present invention may be used in the speckle regime on macroscopic samples or samples with large surface roughness or diffusivity, where the illumination angle is not very important since the speckles are scattered over a large range of angles.

Embodiments of the present invention provide systems and methods for optical, speckle-based measurements and characterization of objects and samples.

Embodiments of the present invention may be used for performing the speckle-based motion, orientation, vibration, and deformation measurement with full sample coverage. Embodiments of the present invention thus facilitate the ability to map the motion, orientation, vibration, and deformation data with a high spatial resolution to distinguish between different parts of the sample while eliminating the need for complex setups with multiple interfering beams. Embodiments of the present invention enable to perform various types of measurements with the same basic system in order to obtain more information on the sample, such as its shape, reflectance/transparency, as well as detailed surface profilometry, texture or interior/exterior 3D structure.

The systems may comprise an illumination unit having one or more light sources (also referred to as illumination sources) and operable to illuminate a sample with coherent and/or incoherent light at variable illumination conditions; a collection unit having imaging optics and imaging sensor/s for collecting light returned from the sample and/or passing therethrough; and a control unit coupled to the collection unit to receive data indicative of at least one of speckle intensity, speckle wavefront, and speckle coherence; and generate a speckle wavefront image; wherein the control unit is further coupled to the illumination unit to affect the illumination conditions or other optical properties.

The control unit may further affect the optical properties of the system and various components. The control unit may affect the illumination conditions, the collection conditions, or both. The control unit may affect the optical properties of the illumination unit and the optical properties of the collection unit. The control unit may maintain a predefined relationship between the optical properties of the illumination unit and the optical properties of the collection unit. The variable illumination conditions may be selected from a group consisting of coherence—coherent illumination, incoherent illumination, partially coherent; the degree of spatial coherence; the degree of temporal coherence; wavelength range; illumination directions; and illumination angles.

The systems may further comprise a beam-splitting arrangement located upstream to the imaging optics to project light onto the sample and collect light returned from the sample through the imaging optics.

The control unit is further to process data snapshots or sequences received from the collection unit under single or multiple illumination conditions (or other optical properties) to determine data indicative of one or more characteristics of the sample, the one or more characteristics of the sample (or the surface of the sample) are from a group consisting of: sample reflectivity, sample transmittance, sample shape, sample depth, 3-dimensional structure of the sample, deformation of a surface of a sample, the motion of a surface of a sample, sample vibration, sample orientation, and sample texture.

The imaging sensor may be a wavefront sensor or a light field sensor. The imaging sensor may be one of a plenoptic camera (light field camera), a Shack-Hartmann wavefront sensor, or a coherence camera wavefront sensor as described in WIPO Patent Application WO/2018/185740, which is incorporated herein by reference.

The wavefront imaging sensor may comprise an encoder having a plurality of similar unit cells and an array of sensor cells located at a distance downstream of said unit cells with respect to a general direction of propagation of input light through the wavefront imaging sensor 108. The array of sensor cells defines a plurality of sub-array unit cells, each sub-array corresponding to a unit cell of said plurality of the unit cells of the encoder, and each sub-array comprising a predetermined number M of sensor elements. The encoder is configured to apply predetermined modulation to input light such that each unit cell of said encoder directs a portion of the input light incident thereon onto sub-array unit cell corresponding therewith and one or more neighboring sub-array unit cells within a predetermined proximity region (PR). The predetermined number M is determined in accordance with a predetermined number of sub-arrays unit cells within the predetermined proximity region.

The illumination source may be a coherent light source to induce speckles on or within the sample, also called "primary speckles". This may be obtained by a light source with a temporal coherence length that is greater than an optical diffusion length or surface roughness of the sample.

The collection unit's imaging optics is configured to obtain a "secondary speckles" image by having a spatial resolution that is sufficient to resolve the speckle pattern induced on or within the sample. The system may be further arranged so that the illumination unit's exit pupil is smaller than the collection unit's entrance pupil. This arrangement ensures that the imaging system will have sufficient spatial resolution to obtain "secondary speckles" on the image plane.

The spatial resolution that is sufficient to resolve the speckle pattern may be obtained when the coherent light source has a spatial coherence length which, as projected onto the sample, is greater than a spatial coherence length of a point-spread-function of the collection unit as projected through the imaging optics onto the sample.

According to embodiments of the invention, the spatial coherence length of the coherent light source is greater than the spatial coherence length of a point-spread-function of the collection unit as projected through the imaging optics onto the sample by a factor of 1.1, 1.2, 1.5, or more.

The system may further be arranged so that a collection angle, which is subtended by an optical aperture of the collection unit as seen from an arbitrary point on the sample, is larger than an illumination angle which is subtended by an optical aperture of the illumination unit as seen from the same point on the sample, for every point on the sample to be imaged (also referred to as every point in the field of view of the collection unit).

The illumination unit may comprise a coherent illumination source and an incoherent illumination source. The coherent source is used to perform speckle wavefront imaging as described above, and ambient light or the incoherent source is used to perform light-field imaging in order to deduce sample luminosity and 3D shape. The illumination source may be selectively operable to provide a coherent light and an incoherent light. The incoherent light may be provided through a large aperture so that the resulting spatial coherence length of the illumination is equal to or shorter than the spatial coherence length of the imaging optics of the collection unit. The control unit may switch between coherent light and incoherent light.

According to aspects of the invention, a system is described for use in optical imaging and measurement of a sample. The system comprising: an illumination unit configured for providing coherent, partially coherent, or incoherent illumination in one or more selected wavelength ranges and/or temporal coherence ranges and/or illumination of the sample from various directions, and directing it onto the sample or a portion of it; a collection unit configured for collecting light returning from the sample and/or passing through it and imaging it using a wavefront imaging or light-field imaging sensor providing data indicative of intensity, wavefront, and coherence of light interacting with the sample; a control unit for analyzing single snapshots or sequences of intensity, wavefront and coherence maps, the control unit also affecting the illumination unit to provide different degrees of spatial and temporal coherence, as well as wavelength ranges and illumination directions; and the control unit processing data snapshots or sequences from collection unit under single or multiple illumination conditions (or other optical properties) to determine data indicative of sample's reflectivity and/or transmittance, shape, depth, 3D structure, deformation, motion, vibration, orientation and/or texture.

According to aspects of the invention, a versatile optical imaging and measuring system based on a wavefront imaging sensor is used in conjunction with a coherent light source in order to perform speckle-based imaging and measurement. In addition, by using ambient or incoherent flood illumination, the same wavefront imaging sensor can be used to perform 2D imaging as well as 3D measurement. By controlling the light source in either wavelength or illumination direction (or both), the system may be used to perform high dynamic-range optical profilometry, quantitative phase imaging, or diffractive tomography.

Such a versatile optical system may provide improved sample coverage, system sensitivity, and robustness. In addition, it uses a simple, robust, single line-of-sight wavefront imaging optics module and simple illumination requirements. Simple changes in the illumination parameters offer great flexibility and application range while keeping the same basic configuration and using the same wavefront imaging optics.

FIG. 1 schematically depicts a system 10 in accordance with an aspect of the invention. The system 10 comprises an illumination unit 102 having a coherent light source (not shown) and an exit pupil 102.1; a collection unit 104 for collecting light returned from the sample and/or passing therethrough; and a control unit 110 coupled to the collection unit 104 for generating a speckle wavefront image and further coupled to the illumination unit to affect the illumination conditions or other optical properties. The collection unit 104 may consist of an imaging optics 106 with an entrance pupil 106.1 and a wavefront imaging sensor 108.

Sample 100 is illuminated with a coherent light IL that induces speckle formation on sample 100 due to the sample's microscopic optical scattering properties. The resultant speckle field (also referred to as a speckle pattern, or "primary" or "objective" speckles) CL is imaged through the collection unit 104. Imaging optics 106 projects an image of the speckle field PL onto a wavefront imaging sensor 108. Speckle wavefront SW is thus formed.

The "primary" speckles may be obtained under the following condition. The illumination unit 102 may comprise a coherent light source with a temporal coherence length that is greater than an optical diffusion length or surface roughness of sample 100.

The collection unit's 104 imaging optics 106 are configured so that a "secondary" speckle image is formed on the image plane. This requires an imaging system with sufficient optical resolution to resolve the "secondary" or "subjective" speckle pattern generated on or within the sample. There are several ways to obtain this condition.

A relation between the optical properties of the illumination unit 102 and the optical properties of the collection unit 104 is selected so that the "secondary" speckle pattern can be resolved with sufficient resolution. According to an embodiment of the invention, the illumination unit's exit pupil 102.1 is smaller than the collection unit's entrance pupil 106.1. "Smaller" in this context may mean that the size of the exit pupil 102.1 is smaller than the size of the entrance pupil 106.1.

According to embodiments of the invention, the size of the exit pupil 102.1 and the size of the entrance pupil 106.1 at the same order, for example, differing by a factor of 1.1, 1.2, 1.5, and by higher factors.

According to embodiments of the invention, the sizes of the exit pupil 102.1 and the size of the entrance pupil 106.1 and the relation therebetween are set in advance. According to other embodiments of the invention, the size of the exit pupil 102.1 and the size of the entrance pupil 106.1 and the relation therebetween are set dynamically and adaptively. The control unit 110 may be coupled to the illumination unit 102 and the collection unit 104 to affect the optical properties of the illumination unit 102 and the collection unit 104. According to embodiments of the invention, the control unit 110 can affect the size of exit pupil 102.1, the size of entrance pupil 106.1, or both, and thus, control the relation therebetween.

The relations between the optical properties of the illumination unit 102 and the optical properties of the collection unit 104 may be described as follows: the coherent light source of the illumination unit 102 may have a spatial coherence length which, as projected onto the sample 100, is greater than a spatial coherence length of a point-spread-function of the collection unit 104 as projected through the imaging optics 106 onto the sample.

Figure 5A:
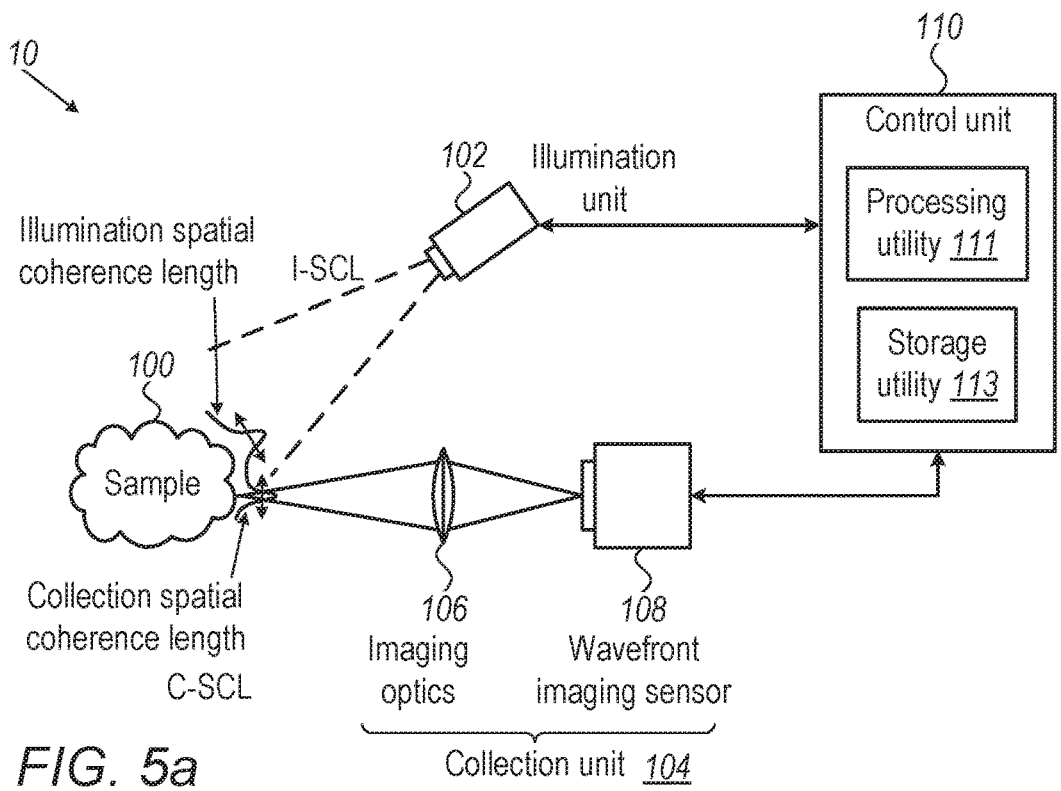
FIGS. 5a-5b are block diagrams that schematically illustrate systems according to embodiments of the invention.
Figure 5B:
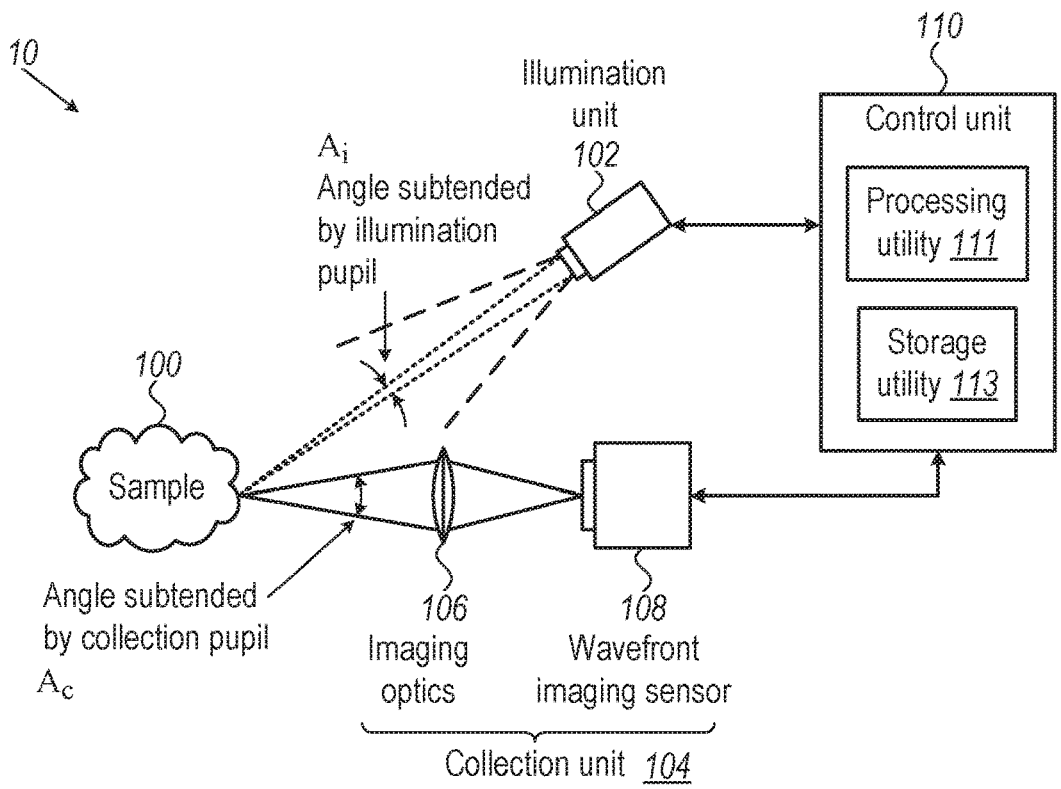

Another way of expressing the relation between the optical properties of the illumination unit 102 and the collection unit 104 is illustrated in FIG. 5b. An angle $A_c$ subtended by an optical aperture of the collection unit 104 as seen from an arbitrary point on the sample 100 should be larger than the angle $A_I$ subtended by an optical aperture of the illumination unit 102 as seen from the same point on sample 100, for every point to be imaged on the sample.

The wavefront imaging sensor 108 may be a plenoptic camera or a Shack-Hartmann wavefront sensor, or other types of coherence cameras that can perform wavefront imaging up to the optical diffraction limit resolution. Such coherence cameras are referred to herein as wavefront imaging sensors.

The control unit 110 analyzes speckle wavefront SW data and generates a speckle wavefront image. The speckle wavefront SW data may be indicative of speckle intensity, wavefront, and coherence. This data is used for measuring and characterizing various properties of sample 100.

The control unit 110 typically includes a processing utility 111 and a storage utility 113, as well as a communication utility enabling input and output communication and possible user interface, which are not specifically shown.

The control system 110 may be integral with the collection unit 104, with the wavefront imaging sensor 108, the illumination unit 102, or a separated unit. In some embodiments, the control unit 110 may be remote from the other elements of imaging system 10 or be based on remote or cloud processing of data. In such configurations, the imaging system 10 may include a communication module configured for transmitting data to the control unit 110 for processing.

Figure 2A:
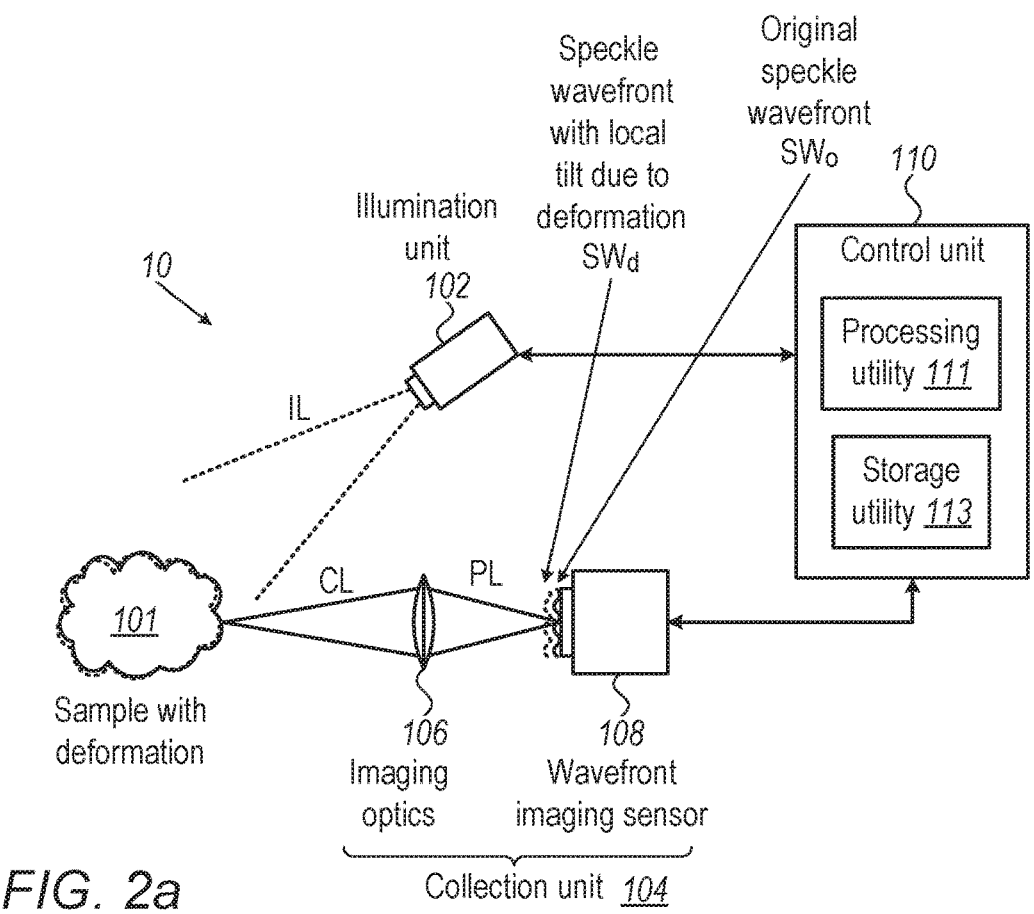
FIGS. 2a-2b are block diagrams that schematically illustrate details of the system shown in FIG. 1.

The operation of system 100 of FIG. 1 will be further discussed with reference to FIG. 2a. The same numeral references are used to designate the same elements as in FIG. 1. System 10 is to measure sample 101, which has been slightly disturbed, for example, underwent a small rotation or deformation. The rotation or deformation of sample 101 is marked in FIG. 2a in dashed lines. The sample's disturbance may occur due to mechanical or thermal stress, external shock, vibration, an acoustic wave traveling through the sample, a biological function such as pulse, breathing, speech, muscle movement, etc.

Figure 2B:
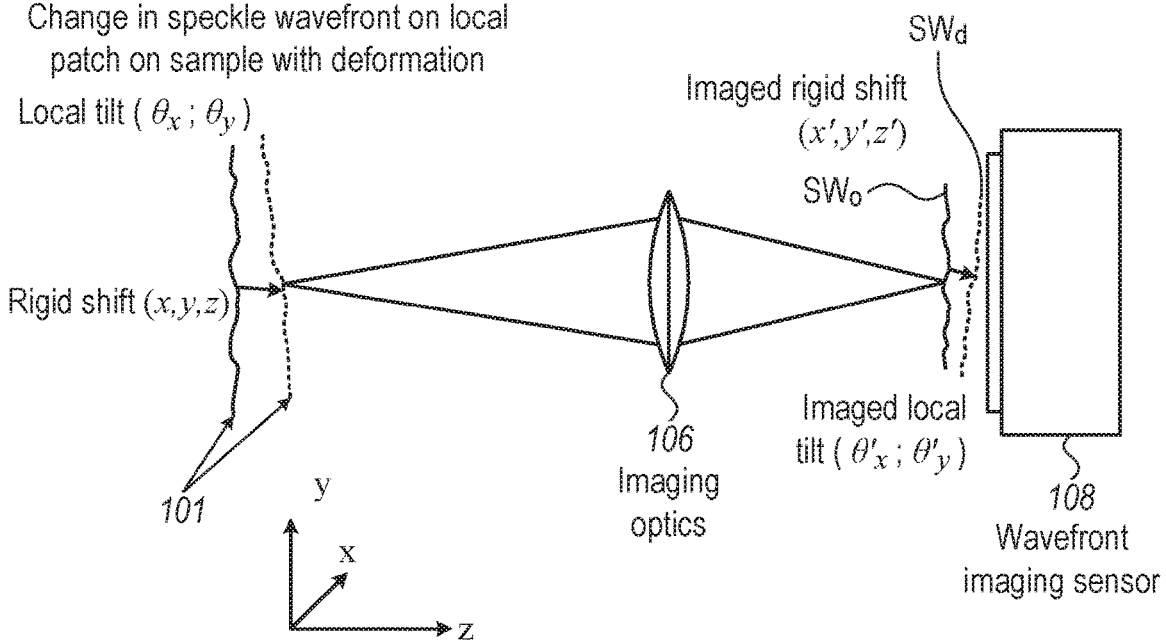

FIG. 2b zooms in on a particular patch of the sample that has been disturbed, and few elements of system 10 are shown—the imaging optics 106 and the wavefront imaging sensor 108. The disturbance of sample 101 corresponds to a local rigid shift and tilt of the patch shown with reference to the solid line representing the undisturbed sample 101 and dashed lines representing the disturbed sample 101.

For simplicity of explanation, we will ignore a possible rotation $\theta_z$, since for small patches the $\theta_z$ rotation can be treated as a rigid shift in (x, y).

In terms of the speckle pattern that develops in the sample (sometimes known as the "primary" or "objective" speckles), the disturbance is manifest as a rigid shift (x, y, z) and tilt ($\theta_x$, $\theta_y$) of the speckle wavefront.

The speckle wavefront SW is imaged through the collection unit's imaging optics onto the wavefront imaging sensor. Speckle wavefront $SW_o$ denotes the speckle wavefront resulted from the illumination of the undisturbed sample, and speckle wavefront $SW_d$ denotes the speckle wavefront resulted from the illumination of the disturbed sample. The corresponding changes in the imaged speckle wavefronts $SW_o$ and $SW_d$ are a rigid shift (x', y', z') and local tilt ($\theta'_x$, $\theta'_y$), where these quantities are related to the original patch quantities by the imaging magnification of the optical system.

Due to optical resolution limits of imaging systems, in most practical macroscopic scenarios, imaged speckle wavefronts have much lower resolution (sometimes known as "secondary" or "subjective" speckles). In practice, this reduction in resolution wipes out any information regarding the rigid shift (x', y', z') in the imaged speckle wavefront, while the information on the local tilt is typically well preserved ($\theta'_x$, $\theta'_y$).

According to an aspect of the invention, a wavefront image of the disturbed speckles is captured. It also appears to have a random wavefront. However, when compared to the original speckle wavefront image of the undisturbed sample, one finds that the speckle wavefronts differ by the local tilt ($\theta'_x$, $\theta'_y$). Thus, by comparing the original speckle wavefront image to the disturbed speckle wavefront image, one can infer and map the local tilt over the entire sample, giving a precise indication of the sample deformation.

The inventors have found out that the local tilt map has spatial resolution enabling to distinguish between different values of local tilt ($\theta'_x$, $\theta'_y$) at different locations on the sample. According to embodiments of the invention, a continuous local tilt map is provided. The continuous local tilt map is spatially dependent and may provide full coverage of the sample. This novel ability improves prior-art speckle-based measurements, where a uniform tilt value is obtained for each distinct and spatially separated illumination spot that impinges on the sample.

Figure 3:
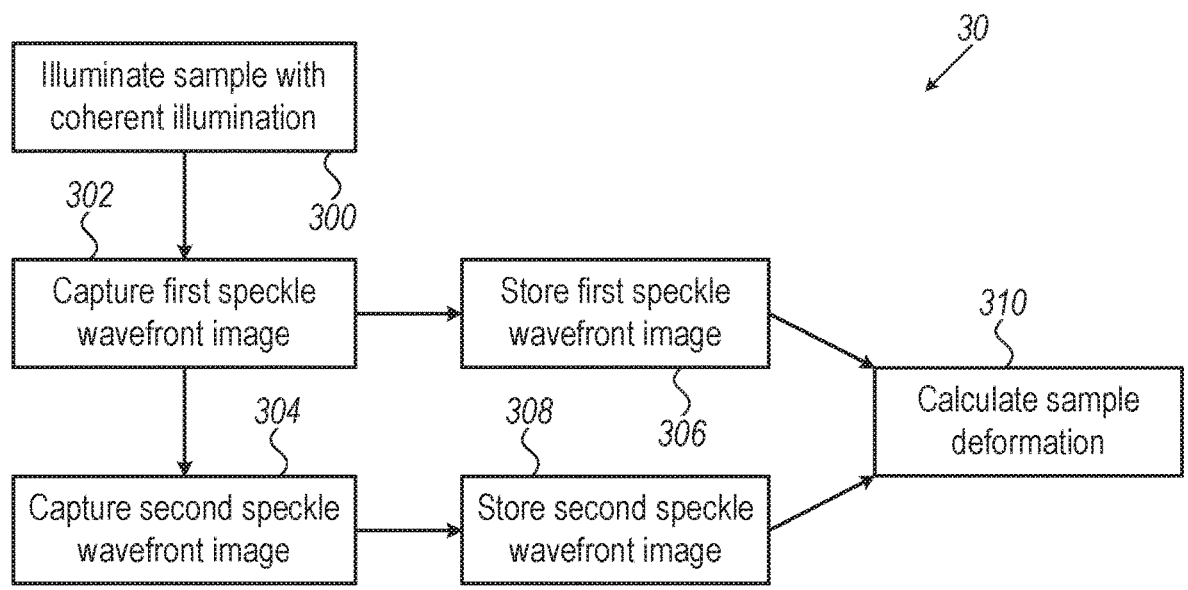
FIG. 3 is a flow diagram that illustrates a method according to an embodiment of the invention.

According to an embodiment of the invention, a series of speckle wavefront images is captured—for example, before and after the sample's deformation. This is illustrated in FIG. 3 as a flow diagram 30. Flow 30 starts with operation 300 of illuminating the sample with a coherent illumination. In operation 302, a first speckle wavefront image is captured. In operation 306, the first speckle wavefront image is stored for further processing. In operation 304, a second speckle wavefront image is captured at a different time than the first speckle wavefront image. The sample may undergo a sample deformation between the capture of the first speckle wavefront image in operation 302 and the capture of the second speckle wavefront image in operation 304. In operation 308, the second speckle wavefront image is stored for further processing. The first and second speckle wavefront images may differ by the local wavefront tilt induced by the deformation. In operation 310, the deformation of the sample is calculated, for example, by comparing the first and second speckle wavefront images and by generating a map of the local wavefront tilt, calculated over the entire sample.

FIG. 4 shows a flow 40 of a series of several speckle wavefronts. In operation 400, the sample is illuminated using coherent illumination. In the loop of operations 402, a time-series of speckle wavefront images is captured (operations 404, 406) and stored (operations 408, 410). In operation 412, the change in local tilt is determined between pairs of speckle wavefront images. For example, the change in local tilt is determined between adjacent pairs of speckle wavefront images. Based on the change in local tilt, a time-dependent spatial mapping of sample deformation can be deduced. In operation 414, a spatio-temporal deformation map sequence is calculated. This is a time-sequence of spatial deformation maps. Each time step corresponds to the spatial deformation map measured between the capture of a speckle wavefront image 404 and the next captured speckle wavefront image 406. The spatio-temporal deformation map sequence can be further analyzed to pick out specific regions of interest in the sample or to differentiate between the sample and its surroundings, or to differentiate between overall movement of the sample vs. local deformations and vibrations, or to perform other spatial or temporal segmentation. For example, depending on the application, the time-dependent deformation of the regions of interest can be analyzed, in operation 416, to extract an acoustic signal such as speech; in operation 418, to measure biometric parameters such as pulse and breathing, and track muscle movement; and, in operation 420, to map mechanical vibration modes. The system can also be used to perform standard 2D and/or 3D imaging using incoherent or ambient light. By using the control unit 110 to affect the illumination unit 102 and synchronously alternate between coherent and incoherent illumination for each frame grabbed by the wavefront imaging sensor 108, the above temporal speckle image sequence 404 and 406 can be interlaced with an incoherent 2D/3D imaging sequence to provide additional data indicative of sample's reflectivity and/or transmittance, shape, depth, 3D structure. These data streams are intrinsically fused since they are obtained using the same collection unit utilizing the same vantage point, the same imaging optics, and the same wavefront imaging sensor. A more detailed description can be found below. According to embodiments of the invention, it is also possible to fuse the spatio-temporal deformation map with external data sources, such as conventional 2D cameras, as well as other types of 3D sensors. In these cases, the data fusion operation has to account for the different vantage points, different imaging optics, and different imaging sensors of the external data sources.

The information that is generated by embodiments of the invention, as illustrated in FIG. 4, are useful for a variety of implementations. For example, the spatial information that is generated in operations 414, 416, 418, or 420 can be used to differentiate between the vibration of the sample due to its external environment and the sample's intrinsic vibration. In this way, it is possible to pick up speech in a noisy environment, monitor the biometric parameters of a person in a moving vehicle, and monitor a specific machine part in a vibrating environment.

The operation of system 100 of FIG. 1 and its configuration will be further discussed with reference to FIG. 5a. The same numeral references are used to designate the same elements as in FIG. 1. According to an embodiment of the invention, the optical properties of the illumination unit 102 are set or selected in relation to the optical properties of the sample to be measured. The optical properties of the illumination unit 102 may be set by pre-selecting an appropriate, coherent illumination source or set selectively under the control of the control unit 110.

System 10 is designed to measure the sample's speckle wavefront deformation. Two conditions must be met: 1) The generation of "primary" speckles on or within the sample. 2) The collection unit's 104 imaging optics 106 must have sufficient optical imaging resolution (also referred to as "spatial resolution") so that "secondary" speckles SW are formed at the image plane of the wavefront imaging sensor 108.

According to embodiments of the invention, optical properties such as temporal coherence length, spatial coherence length, illumination aperture, size of the illumination unit's exit pupil, collection aperture, size of the collection unit's entrance pupil, wavelength, the direction of illumination, and collection relative to the sample are selected in advance. According to other embodiments of the invention, some or all of the optical properties of the illumination unit 102 and the collection unit 104 are adjustable and controllable by the control unit 110.

The first condition may be obtained when system 10 is to measure sample 100 that is characterized by a certain optical diffusion length or by a certain sample surface roughness (not shown in FIG. 5a). The coherence illumination source of Illumination unit 102 is set to have a longitudinal coherence length $L_L$ (also known as temporal coherence length), that is at the order of—or greater than the optical diffusion length or surface roughness $L_S$ of sample 100.

A coherent wave maintains a specified level of coherence over a propagation distance denoted temporal coherence length $L_L$. The value of $L_L$ is typically given by $\lambda^2/\Delta\lambda$, where $\lambda$ denotes the illumination source's central wavelength, and $\Delta\lambda$ is the illumination source's spectral width. For example, single-mode lasers with very narrow spectra can have coherence lengths in the orders of meters to kilometers. Multimode lasers with wider spectral widths have coherence lengths in the order of centimeters to decimeters, while simple diode lasers typically have coherence lengths in the order of a millimeter or less. Even light-emitting diodes (LEDs) with sufficiently narrow spectra (~10 nm) can have significant coherence lengths in the order of several tens of microns.

The optical diffusion length of a sample corresponds to the mean path difference of light as it propagates through the sample before exiting the sample and being subsequently captured by the collection system. Light propagating through a sample consisting of multiple random scatterers undergoes multiple propagation paths, each one with a different and random optical path length. The standard deviation of the different propagation path lengths indicates the optical diffusion length of the sample $L_S$. When such a sample with diffusion length $L_S$ is illuminated with coherent light with a coherence length $L_L > L_S$, a primary speckle pattern is generated.

For samples with surface roughness, the typical length $L_S$ corresponds to the surface roughness statistics, usually the surface roughness standard deviation. Again, primary speckles are obtained when the sample is illuminated with coherent light with a coherence length $L_L > L_S$.

Finally, we note that in most situations where primary speckles are formed $L_L > L_S > \lambda$. However, the requirement $L_S > \lambda$ can be relaxed if the optical system is configured so that the "zero-order" brightfield specular reflection (or direct transmission for a translucent sample) is not captured by the collection unit. In microscopy, such a configuration is typically referred to as "darkfield" illumination conditions.

By selecting the coherence illumination source to comply with a specified coherence length requirement, high contrast speckle image can be obtained. The requirement that the temporal coherence length will be at the order of the optical diffusion length or surface roughness of the sample ensure a strong speckle response while the coherent illumination impinges on the surface or goes therethrough.

According to an embodiment of the invention, the optical properties of the illumination unit 102 are further set in relation to the optical properties of the collection unit 104. The optical properties of the illumination unit 102 may be set by pre-selecting an appropriate, coherent illumination source or set selectively under the control of the control unit 110. The optical properties of the collection unit 104 may be controlled by the control unit 110. These settings are required so that secondary speckles are obtained on the system's image plane when the primary speckles are generated on the sample.

The illumination unit 102 is characterized by a spatial coherence length $L_I$ (also known as the transverse coherence length, denoted by I-SCL in FIG. 5a) of the illumination source, as projected over the sample. The spatial coherence length describes the relationship between the illuminated waves at different points in space and is a measure of the lateral distance between pairs of points on the sample that are still mutually coherent to a certain degree.

The collection unit 104 is characterized by a spatial coherence length of the point-spread-function of the collection unit's imaging optics as projected through the imaging optics onto the sample, denoted by the value $L_C$ (C-SCL in FIG. 5a).

To obtain speckle wavefront imaging, i.e., generate secondary speckles on the system's image plane, the spatial coherence length $L_I$ of the illumination source of the illumination unit 102, as projected onto the sample, may be greater than the spatial coherence length $L_C$ of the point-spread function of the imaging optics 106 of the collection unit 104, as projected through the imaging optics 106 onto the sample 100. Mathematically this relation is given by $L_I > L_C$. This is schematically shown in FIG. 5a.

The relation between the optical properties of the illumination unit 102 and the collection unit 104 can also be expressed as the condition that an angle $A_c$ subtended by an optical aperture of the collection unit 104 as seen from an arbitrary point on the sample 100 be larger than the angle $A_I$ subtended by an optical aperture of the illumination unit 102 as seen from the same point on sample 100, for every point to be imaged on the sample. This is illustrated in FIG. 5b. The statement $A_I < A_C$ is the Fourier-optics equivalent of the previous relation $L_I > L_C$.

The relation between the optical properties of the illumination unit 102 and the collection unit 104 can also be expressed as the requirement that the exit pupil of the illumination unit (element 102.1 shown in FIG. 1) be smaller than the entrance pupil of the collection unit (element 106.1 shown in FIG. 1). This is geometrically equivalent to the statement $A_I < A_C$, and is the Fourier-optics equivalent of the relation $L_I > L_C$.

Figure 6A:
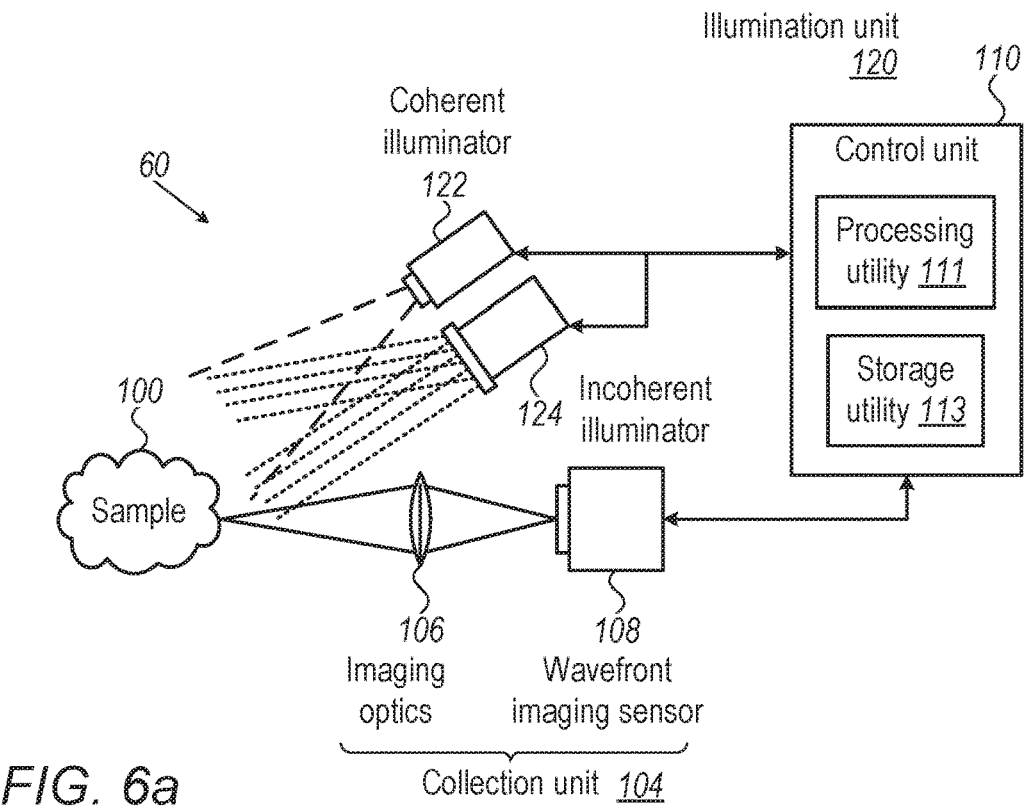
FIGS. 6a-6b are block diagrams that schematically illustrate systems according to embodiments of the invention.
Figure 6B:
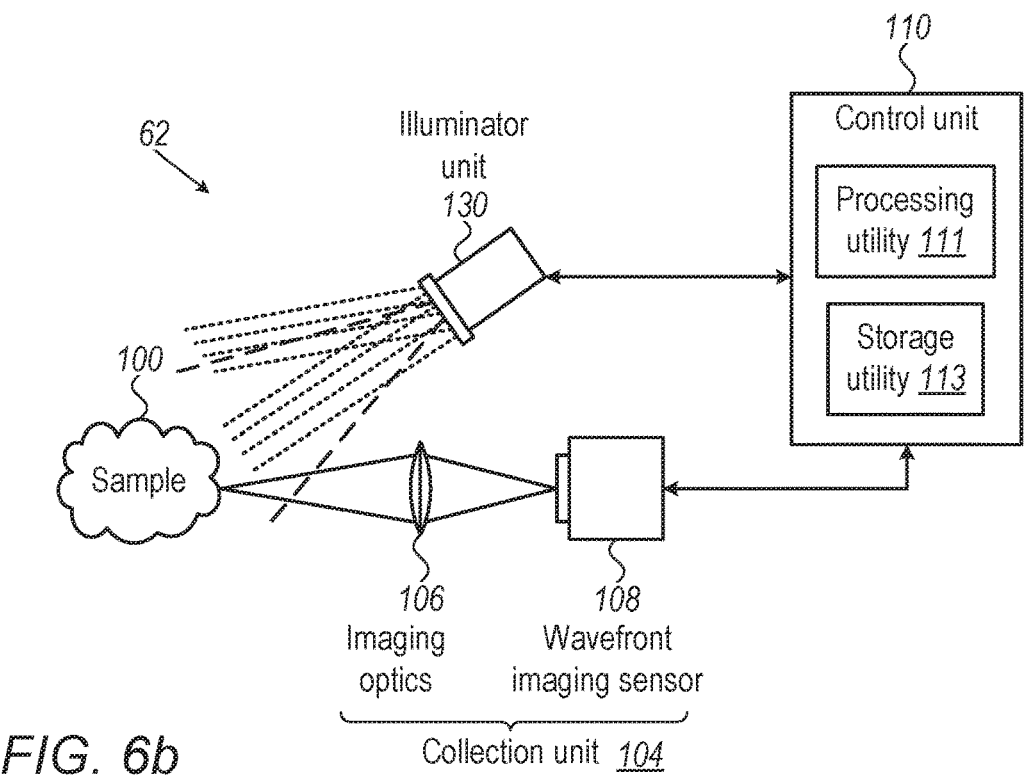

FIGS. 6a and 6b are schematical illustrations of system 60, 62 that are capable of incoherent wavefront Imaging for two-dimensional (2D) and three-dimensional (3D) imaging. Same elements of systems 60, 62, and system 10 of FIG. 1 are referenced with the same numeral references.

As shown in FIG. 6a, the illumination unit 120 of system 60 comprises a coherent illuminator 122 and an incoherent illuminator 124. The incoherent illuminator 124 may be realized as an ambient light source or as an incoherent flood illuminator.

As shown in FIG. 6b, the illumination unit 130 of system 62 can provide both coherent and incoherent lighting. The coherent lighting (shown in FIG. 6b in solid lines) is projected through a small aperture, while the incoherent illumination (shown in FIG. 6b in dashed lines) uses a large aperture. Due to the use of the large aperture, the resulting spatial coherence length of the illumination is equal to or shorter than the spatial coherence length of the collection unit's imaging optics. According to embodiments of the invention, the spatial coherence length of the collection unit's imaging optics may be greater than the spatial coherence length of the illumination by a factor of 1.0 or more.

An incoherent wavefront image (sometimes known as a "light field image") is captured under incoherent illumination and is then analyzed to extract the 2D intensity image and depth data, according to known techniques.

Thus, embodiments of the invention facilitate versatile, cost-effective imaging systems and methods that can be used for a variety of use cases. For example, highly secure biometric authentication can be efficiently performed. The incoherent illumination mode (as explained with reference to FIGS. 6a-6b) can be used to perform 2D and 3D imaging of a person's face for authentication purposes. The coherent speckle-based imaging sequence (as described with reference to FIGS. 1 to 5b) can be used to perform authentication by picking up a person's biometric markers such as the facial pulse pattern, breathing, muscle movement, and speech. Both authentication methods can be combined using the same system by switching between illumination methods.

Figure 7A:
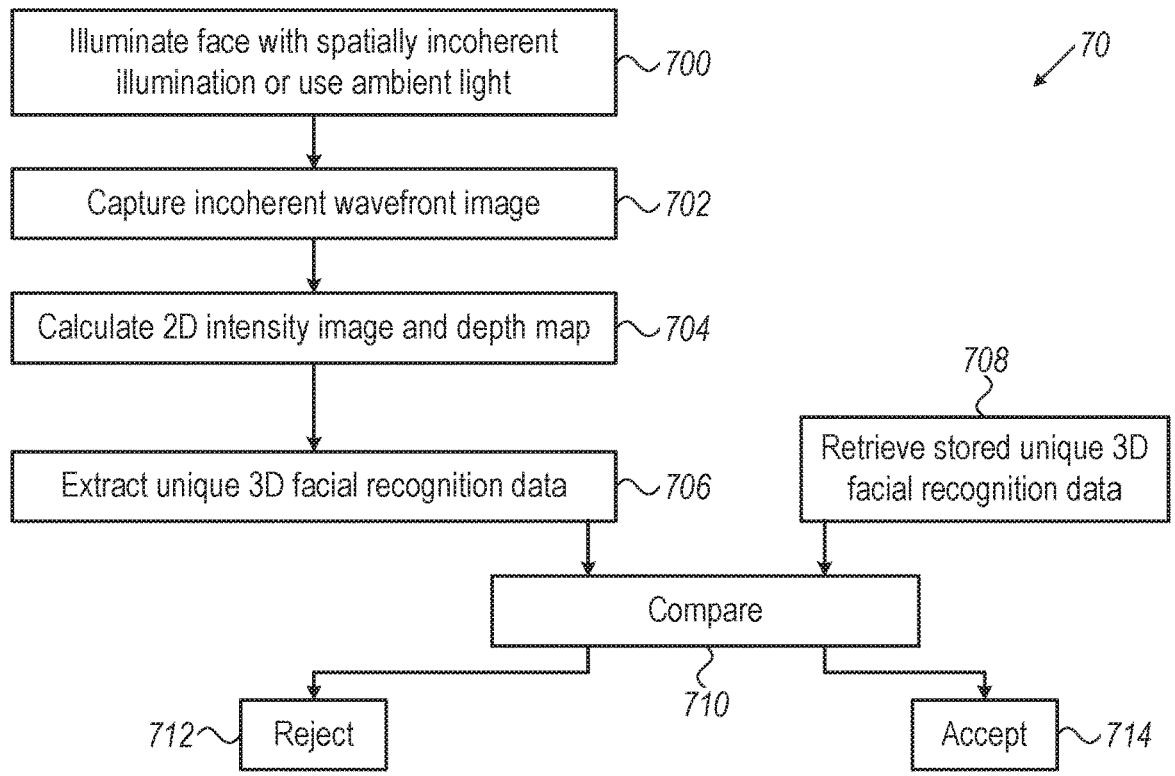

FIG. 7a describes a flow 70 for performing 2D/3D imaging, for example, for facial biometric authentication. In operation 700, a person's face is illuminated by ambient lighting or incoherent flood lighting. In operation 702, an incoherent wavefront image snapshot of a person's face is captured. In operation 704, the wavefront image is analyzed, and the 2D intensity image and the corresponding 3D depth map are calculated. In operation 706, the 2D intensity image and the corresponding 3D depth map are further analyzed to extract unique 3D facial recognition data, e.g., by using an artificial neural network. In operation 708, stored 3D facial recognition data captured, for example, during enrollment to the system are retrieve (or received from an external source). In operation 710, the extracted unique 3D facial recognition data is compared to the stored 3D facial recognition data. A decision is made if to accept the person (in operation 714) or reject the person in operation 712).

Figure 7B:
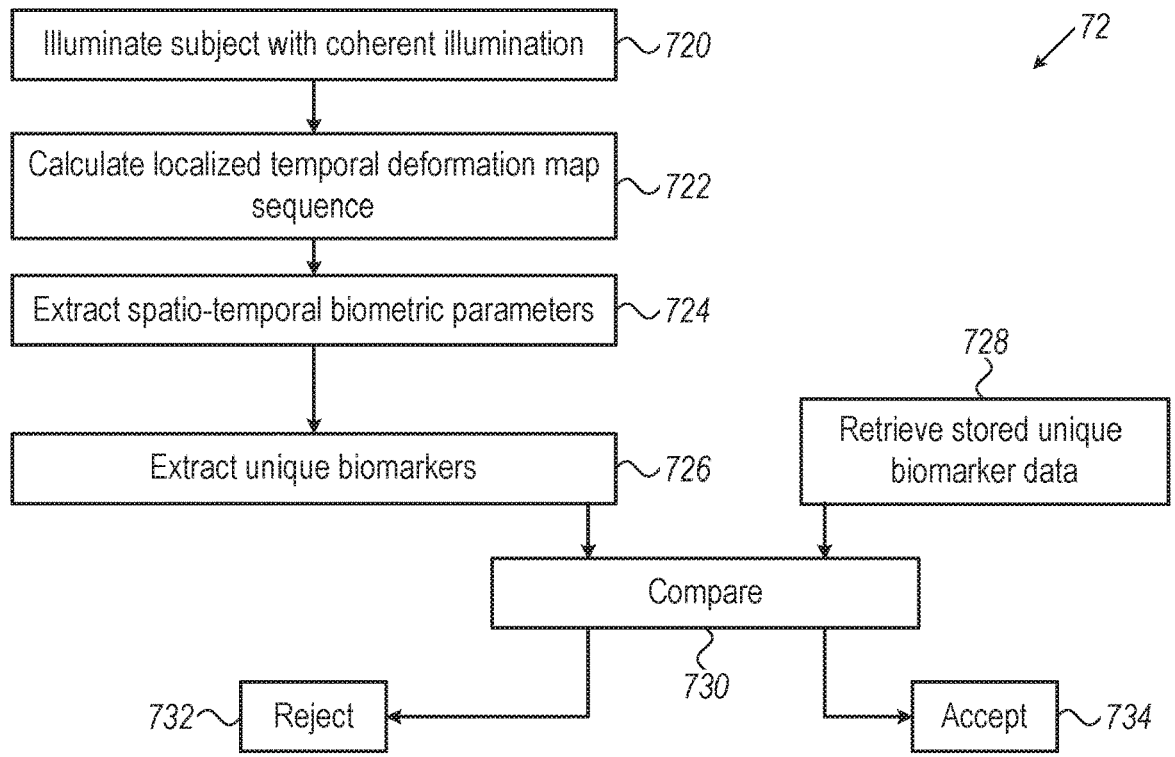

FIG. 7b describes a flow 72 for speckle wavefront imaging, for example, for performing biometric authentication. In operation 720, the subject is illuminated using coherent illumination. In operation 722, a time-series of speckle wavefront images is captured, and the localized spatio-temporal deformation map sequence is calculated. In operation 724, the deformation maps are analyzed to obtain specific biometric parameters (biomarkers) such as facial pulse pattern, breathing, speech, coordinated muscle movements and twitching, and more. The biometric parameter data may be further analyzed in operation 726 to extract unique biomarker recognition data, e.g., by using an artificial neural network. In operation 728, stored biomarker data obtained, for example, during enrollment to the system are retrieve (or received from an external source). In operation 730, the extracted unique biomarkers are compared to the stored biomarkers, and a decision is made if to accept the person (in operation 734) or reject the person (in operation 732).

FIG. 7c describes a combined authentication flow 74, using both coherent and incoherent wavefront imaging flows 70 and 72 described in FIGS. 7a and 7b. Flows 70 and 72 may be performed in sequence by switching between the illumination conditions. For example, the incoherent wavefront imaging authentication sequence described in FIG. 7a is performed first, under ambient or incoherent illumination, and then the speckle-based wavefront imaging authentication described in FIG. 7b is performed using coherent illumination, or vice versa. In operation 740, The combined authentication data from both methods is analyzed and is used to perform a decision to accept the person (in operation 744) or reject the person (in operation 742).

For ease of explanation, FIG. 7c shows the performance of flows 70 and 72 as separate flows in their entirety, up until operation 740 of multi-parameter authentication. It is clear that the various operations of flows 70 and 72 can be performed concurrently or sequentially.

For example, using system 60 of FIG. 6a or system 62 of FIG. 6b, operations 700 (of flow 70) and operation 720 (of flow 72) may be performed sequentially. In the case of system 60, the operation of the coherent illuminator 122 and the incoherent illuminator 124 will be switched sequentially. In the case of system 62, illumination unit 130 may be controlled to alter between its coherent illumination mode and incoherent illumination mode. Consequently, operations 702 (of flow 70) and operation 722 (of flow 72) may be performed sequentially by the same system elements (e.g., collection unit 104 and control unit 110 of FIG. 1). In the same manner, operations 704, 706, 708 (of flow 70) and operation 724, 726, 728 (of flow 72) may be performed, concurrently or sequentially, by the control unit. Operations 710 (of flow 70) and operation 730 (of flow 72) may be performed concurrently or sequentially and provide the reject decision or the accept decision as input for operation 740 of flow 74. Alternatively, the performance of operation 710 (of flow 70) and operation 730 (of flow 72) may be integrated and constitute operation 740 of flow 74. Other modifications and alterations can be made to this flow without departing from the scope or spirit of the various embodiments.

The versatility of the imaging systems according to embodiments of the invention, can also be used to perform combined monitoring of persons or inanimate objects by alternating between coherent and incoherent imaging. For example, biometric monitoring of persons can be performed, e.g., for vital life signs, pulse, breathing, gaze tracking, facial expression recognition. Another use would be to perform combined monitoring of a machine's vibration as well as overall 2D and 3D image monitoring.

In combined coherent and incoherent monitoring, a sequence of wavefront images is captured under illumination conditions that alternate between coherent illumination and ambient light or incoherent illumination as affected by the control unit. The images can then be separated into two sequences, one of the incoherent images and the other of coherent images. The set of coherent images is used to calculate the spatio-temporal distortion maps and extract specific vibration patterns or biometric parameters as described previously. The set of 2D and 3D images can be used to monitor overall shape, form, changes in reflectivity, and other imaging parameters of interest.

In general, the sequence of wavefront images need not be partitioned at a 1:1 ratio between coherent and incoherent illumination. Depending on the application, it may be beneficial to obtain several coherent wavefront images for each incoherent wavefront image and vice versa.

As previously mentioned, under coherent lighting conditions, a single speckle wavefront image provides little information regarding the sample due to its random-phase wavefront. The randomness is induced by the interaction between illumination and sample, whose optical diffusion length or surface roughness is smaller than the temporal coherence length of the light used to illuminate the sample. The random phase wavefront is not suitable for standard phase unwrapping techniques such as those used in the Rytov approximation. However, by obtaining speckle wavefront images at several wavelengths, it is possible to perform multi-spectral phase unwrapping and recover the sample's surface profile on opaque samples or internal structure for translucent samples.

Without loss of generality, we treat a large surface profile step with normal coherent illumination. The meaning of the "large" step profile will be made clear shortly. Also, the principles described here are valid for random roughness as well as for transmission and/or reflection through or off a translucent sample. In the case of reflection off a surface with random roughness, the random surface profile induces random optical path lengths for the light that impinges on the surface. In the case of transmission or reflection through a translucent sample, random scattering due to the internal structure of the sample also induces random optical path lengths for the light interacting with the sample. Moreover, a translucent sample with surface roughness will induce random optical path lengths due to both effects. In all cases, the example of reflection off a large surface profile step to be presented below provides a good proxy for explaining how the optical path length difference between two points on the sample is measured.

In accordance with an aspect of the invention, FIG. 8a is showing coherent illumination 800 with wavelength $\lambda$ that impinges at normal incidence on a step profile 810 of height h. The light 820 is reflected from either side of step 810, as shown in FIG. 8b. We note that whereas the incident light had a uniform wavefront as depicted in FIG. 8a, the reflected light's wavefront has a phase dislocation, denoted by a dashed line D in FIG. 8b. The phase difference between the left and right halves of the step profile is a result of the optical path difference of $\Delta L=2h$ accumulated in the round trip the light underwent upon reflection from either side of step profile 810. This leads to a phase difference of $2\pi\Delta L/\lambda$ radians between either side of the reflected wavefront. However, an imaging wavefront sensor (e.g., element 108 of FIG. 1) can measure the fractional part of this phase difference only up to $2\pi$, i.e., it is insensitive to phase differences that are an integer number of wavelengths. Thus, the measured phase difference is an accurate estimate of the step height only for "small" step heights that obey $\Delta L<\lambda$. For larger step heights, the integer part of the phase shift leads to an ambiguity in estimating the step height.

The height ambiguity can be resolved by measuring the phase difference at several wavelengths. For example, for two close wavelengths $\lambda$, $\lambda'=\lambda+\Delta\lambda$ we would measure phase differences of $\phi=2\pi\Delta L/\lambda$ and $\phi'=2\pi\Delta L/(\lambda+\Delta\lambda)$, which under the assumption $\Delta\lambda" \lambda$ can be written to first-order as $\phi'=\phi-2\pi\Delta L\Delta\lambda/\lambda^2$. Thus, the variation in the phase difference between both wavelengths is approximately $\Delta\phi=-2\pi\Delta L\Delta\lambda/\lambda^2$. Again, this phase difference is measured only up to an integer number of wavelengths, i.e., there is a $2\pi$ phase ambiguity. However, the range of validity where the actual difference is unambiguous now much larger $\Delta L<\lambda\cdot\lambda/\Delta\lambda$, which is a factor of $\lambda/\Delta\lambda$ greater than for the small step height. The quantity $\lambda^2/\Delta\lambda$ is sometimes referred to as the "synthetic wavelength" since it defines a virtual wavelength for which phase ambiguity is resolved.

The above principle readily extends to multi-spectral phase unwrapping techniques, as illustrated in FIGS. 10a-10b.

FIG. 10a schematically shows a series 900 of 2D phase maps (phase images) $\phi_1(x, y)$, $\phi_2(x, y)$, ..., $\phi_n(x, y)$ that is measured at wavelengths $\lambda_1, \lambda_2, \ldots, \lambda_n$. In this case, the additional wavelengths help resolve the height ambiguity more robustly over a wider range of optical path length differences. For each point (x, y) in the set of 2D phase maps (marked by an "X" label on each map $\phi$ in FIG. 10a), we calculate the optical path length $\Delta L$ as follows. We start by choosing the phase at a certain wavelength. Then, for each pair of adjacent wavelengths, we calculate the phase difference $\Delta\phi$ at the point under consideration. We can then accumulate the phase differences as a function of wavenumber $k=2\pi/\lambda$. This akin to performing the discrete approximation to the integral of Equation 1.

$$\phi(k) = \int^k \frac{d}{dk'}\phi(k')dk',$$

$$\text{i.e., } \phi(k_j) = \sum_i^{j-1}(\phi(k_{i+1}) - \phi(k_i))$$

Equation 1

Figure 9A:
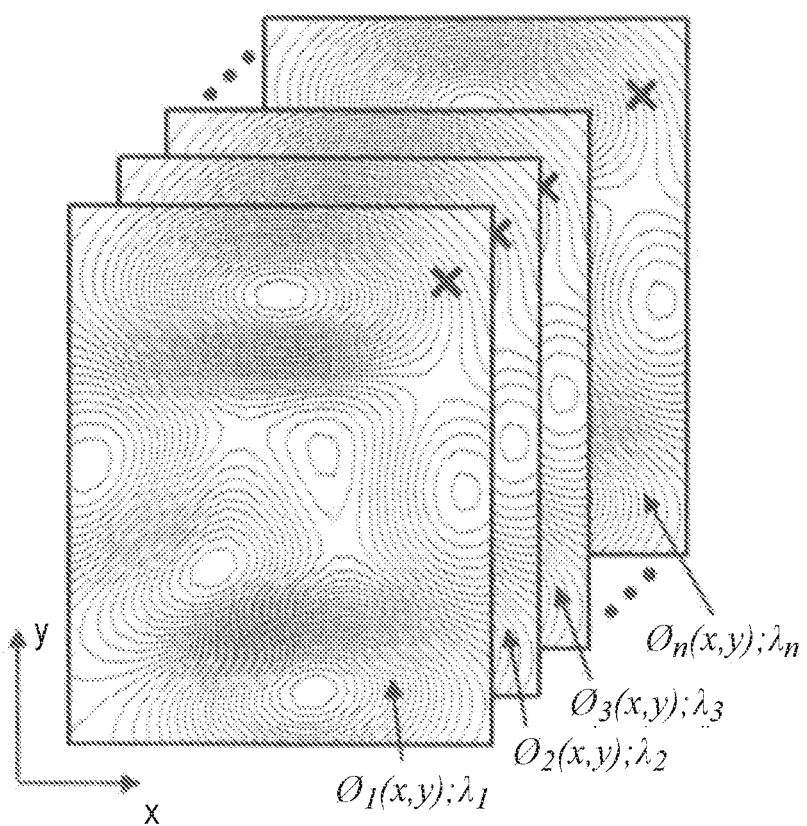
FIGS. 9a-9b schematically illustrate multi-spectral phase unwrapping techniques in accordance with an embodiment of the invention.
Figure 9B:
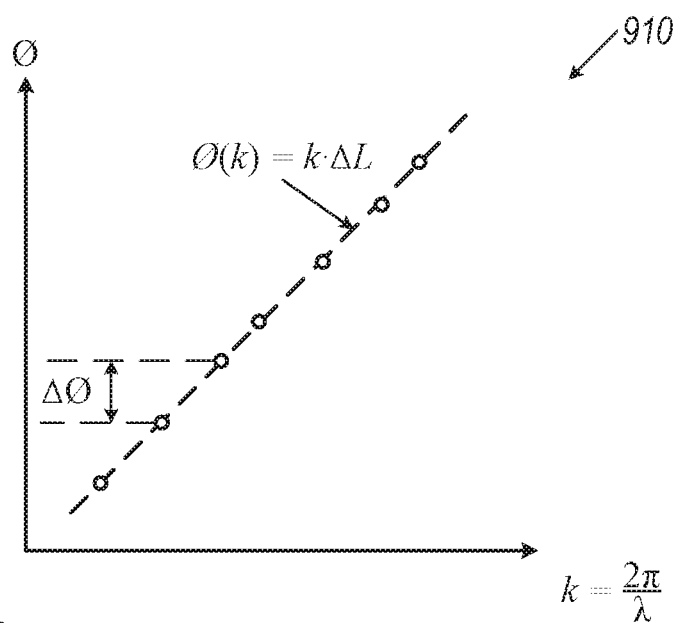

The resulting cumulative phase difference as a function of wavenumber yields a linear plot 910, illustrated in FIG. 9b. The slope of plot 920 is directly related to the optical path difference $\Delta L$ through the relation $\phi=2\pi/\lambda\cdot\Delta L$. Repeating for each point in the set 900 of phase maps yields the optical path length map $\Delta L(x, y)$.

The above multi-spectral phase unwrapping technique is directly applicable to the speckle wavefront images obtained by systems according to embodiments of the invention. The random nature of the speckle wavefront obtained at a single wavelength is a result of a random distribution of large optical path differences $\Delta L$ induced by the interaction of the coherent light and the sample itself. As explained above, the optical path differences can be the result of surface roughness in the case of a reflective opaque sample, or due to optical diffusion in a translucent target, or a combination of both. The typical optical path difference is much larger than the wavelength $\Delta L>\lambda$, hence for a single wavelength, there is a phase ambiguity which when taken alone, cannot be used to ascertain the optical path difference. The sample's structure is directly related to the optical path difference, and since the latter is ambiguous, it is virtually impossible to reconstruct the sample's structure from a single wavelength phase image.

However, by obtaining a series of speckle wavefront images at a set of wavelengths $\lambda_1, \lambda_2, \ldots, \lambda_n$ (as illustrated in FIGS. 9a-9b) it is possible to perform the multi-spectral phase unwinding as described above, and thus obtain an operational and practical estimation of the spatial distribution of $\Delta L$. For a reflective sample, $\Delta L$ is just twice the surface profile according to the relation $\Delta L=2h$. For a transmissive sample, the optical path difference is directly related to the variations in the refractive index distribution by $\Delta L=t\cdot\Delta n$, where t is the sample thickness, and $\Delta n$ is the deviation of the refractive index from some reference nominal value.

Figure 10:
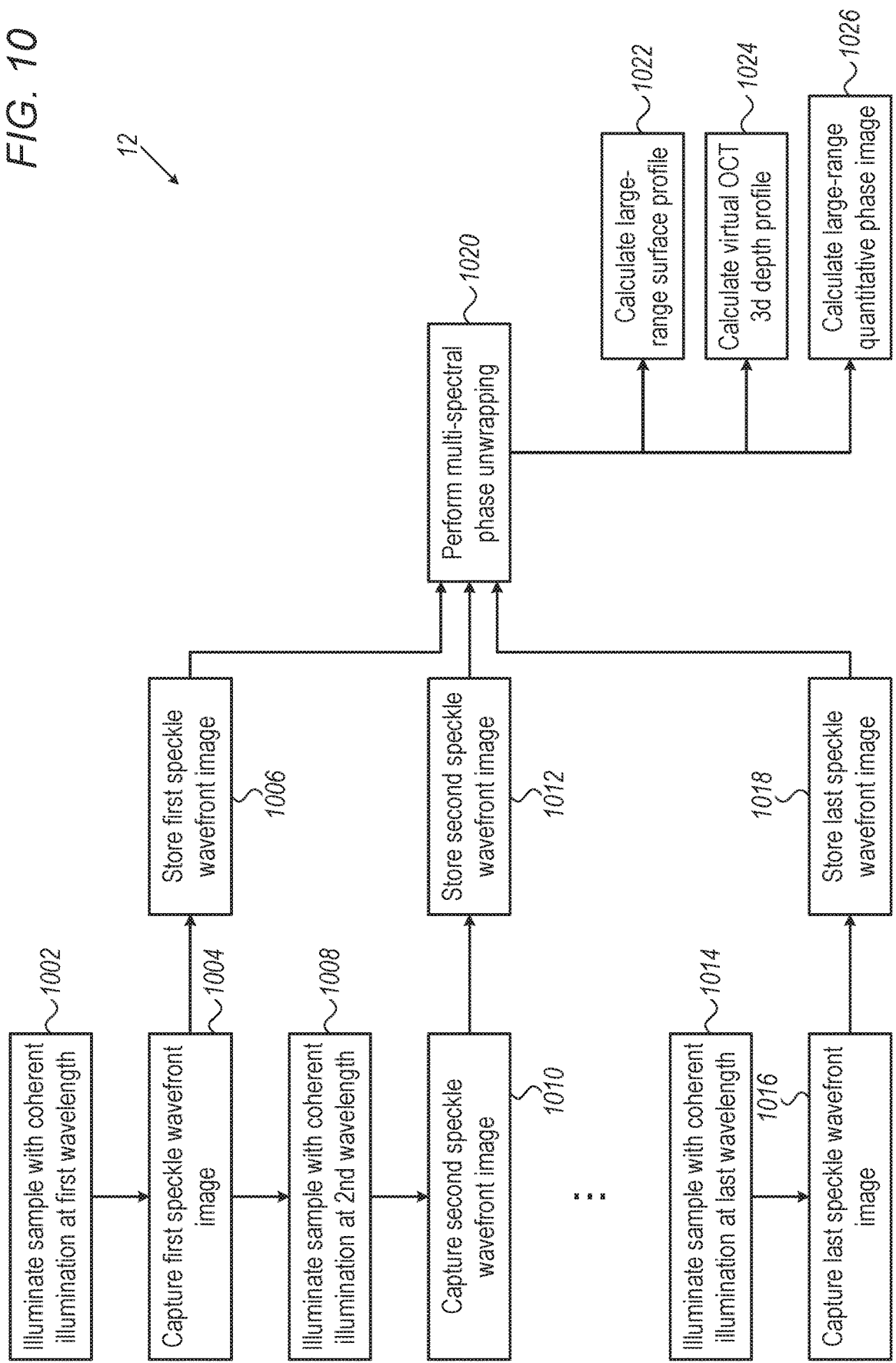
FIG. 10 is a flow diagram that illustrates a method according to an embodiment of the invention.

FIG. 10 is a flow diagram showing a measurement flow 12 according to an embodiment of the invention. In this embodiment, the illumination source is required to provide coherent illumination at several wavelengths. This can be realized, for example, by using a broadband source with a filter wheel or with tunable filters, e.g., a supercontinuum laser with a tunable acoustic filter. By another example, a tunable laser light source can be used. By yet another example, the illumination module can contain several light sources, each at several wavelengths, where each one is employed separately in turn.

Flow 12 starts with operation 1002 of illuminating the sample with a coherent illumination at a first wavelength. The respective speckle wavefront image is captured in operation 1004 and stored in operation 1006. In operation 1008, the sample is coherently illuminated with the second wavelength, and again, a speckle wavefront image is captured (operation 1010) and stored (operation 1012). This is repeated for all the remaining wavelengths (illustrated in FIG. 10 by three dots followed by operations 1014, 1016, and 1018. In operation 1020, for each spatial point in the series of speckle wavefront images, the phase ambiguity is determined according to the multi-spectral phase unwrapping procedure just described. This yields a spatial distribution of the optical path differences ΔL. Depending on the sample type and application, the spatial mapping of optical path differences ΔL can be used to estimate the surface profile (in operation 1022), the refractive index distribution, or a combination of both. For example, a large range surface profile can be calculated (in operation 1022), virtual optical coherence tomography (OCT) 3D depth profile can be obtained (calculated in operation 1024), and a large range quantitative phase image can be generated (calculated in operation 1026).

Note that without loss of generality, the processing and phase unwrapping of the speckle wavefront images can proceed in conjunction with the spectral image acquisition sequence described above.

According to embodiments of the invention, multi-spectral diffraction tomography can be performed. This is akin to performing multi-spectral speckle wavefront imaging for a set of different illumination angles.

Figures 11A, 11B, 11C:
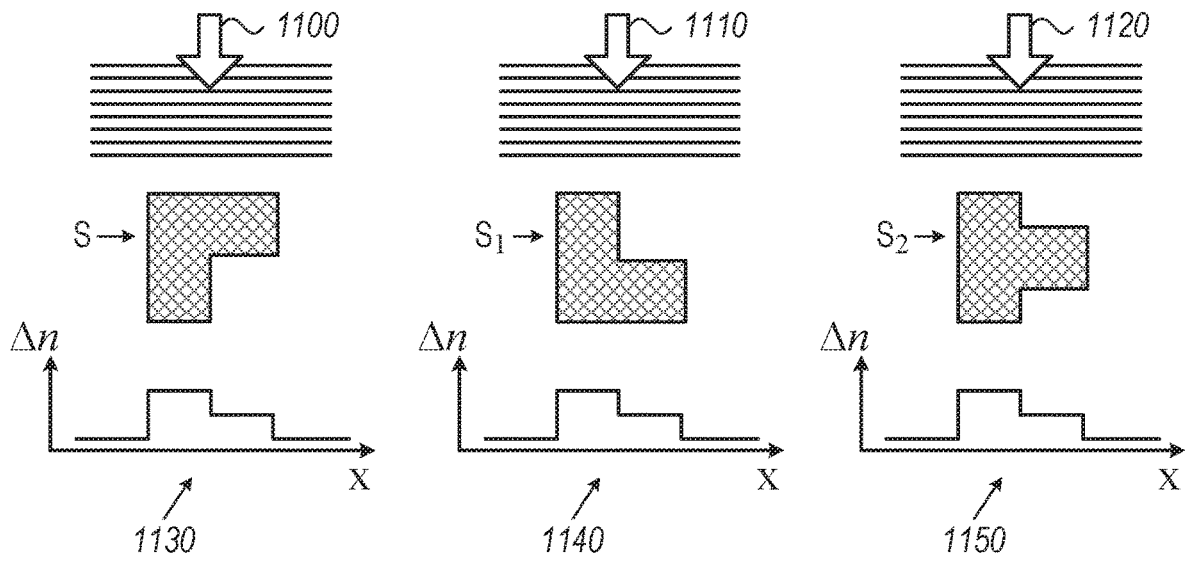
FIGS. 11a-11c schematically illustrate multi-spectral diffraction tomography methods according to aspects of the invention.

FIG. 11a depicts an L shaped translucent object S illuminated from above by coherent illumination 1100. A stepped refractive index profile Δn 1130 is obtained by performing multi-spectral speckle wavefront imaging as described with reference to FIG. 10. However, this profile Δn 1130 is not enough to deduce the 3D refractive index distribution of object S. FIGS. 11b and 11c show objects $S_1$ and $S_2$ that would yield refractive index profiles Δn 1140 and 1150, that are similar to refractive index profiles Δn 1130. The refractive index profiles are similar because multi-spectral speckle wavefront imaging gives an estimate of the total cumulative refractive index over the entire sample thickness, as noted in Equation 2.

$$\Delta L = t \cdot \Delta n. \qquad \text{Equation 2}$$

Figure 12:
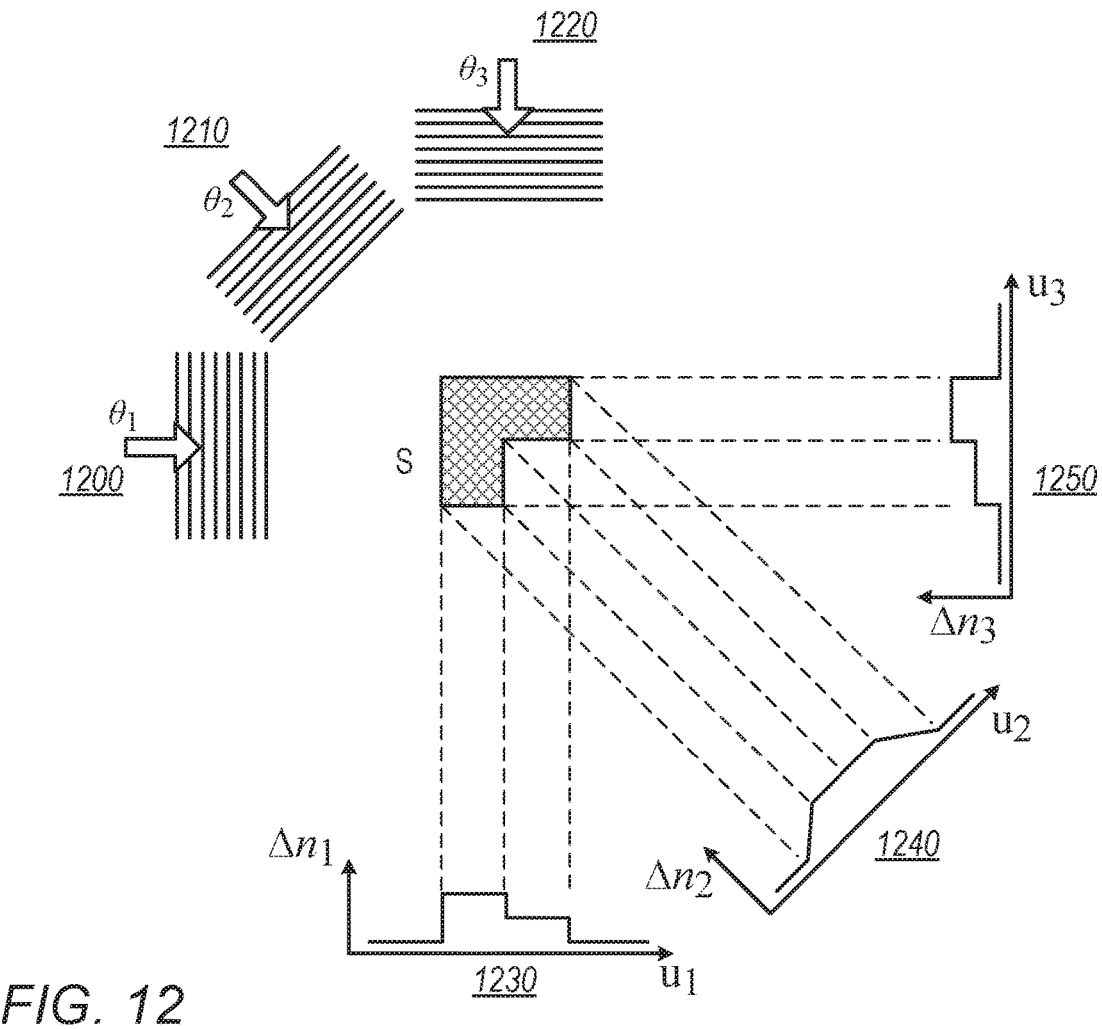
FIG. 12 schematically illustrates multi-spectral speckle wavefront imaging from several illumination angles according to an aspect of the invention.

The ambiguity of refractive index profiles can be resolved by performing multi-spectral speckle wavefront imaging from several illumination angles, as shown in FIG. 12. Each illumination angle $\theta_i$ 1200, 1210, 1220 (i=1, 2, 3) produces a different refractive index profile $\Delta n_i$ 1230, 1240, 1250, respectively. The correct 3D refractive index profile of the object can then be estimated using known tomographic techniques such as the inverse Radon transform.

Figure 13:
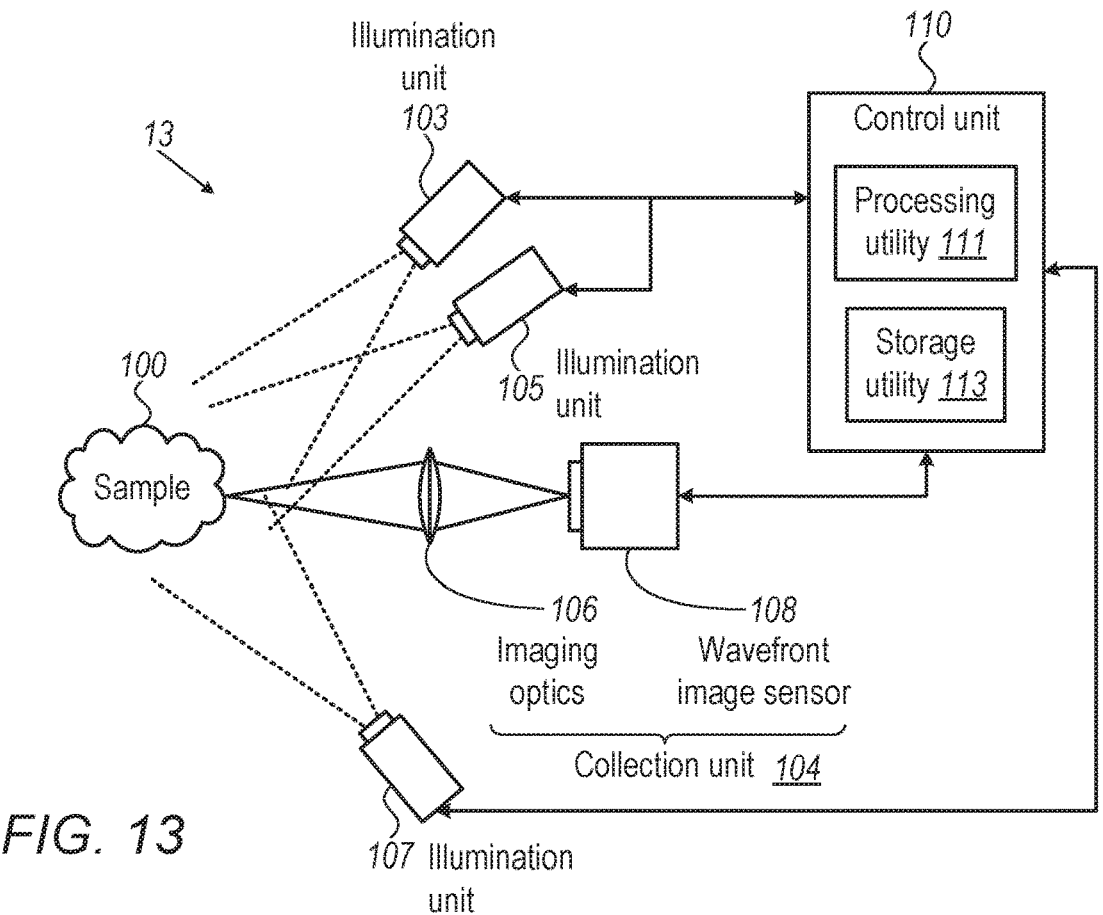
FIG. 13 is a block diagram that schematically illustrates a system according to an embodiment of the invention.
Figure 14:
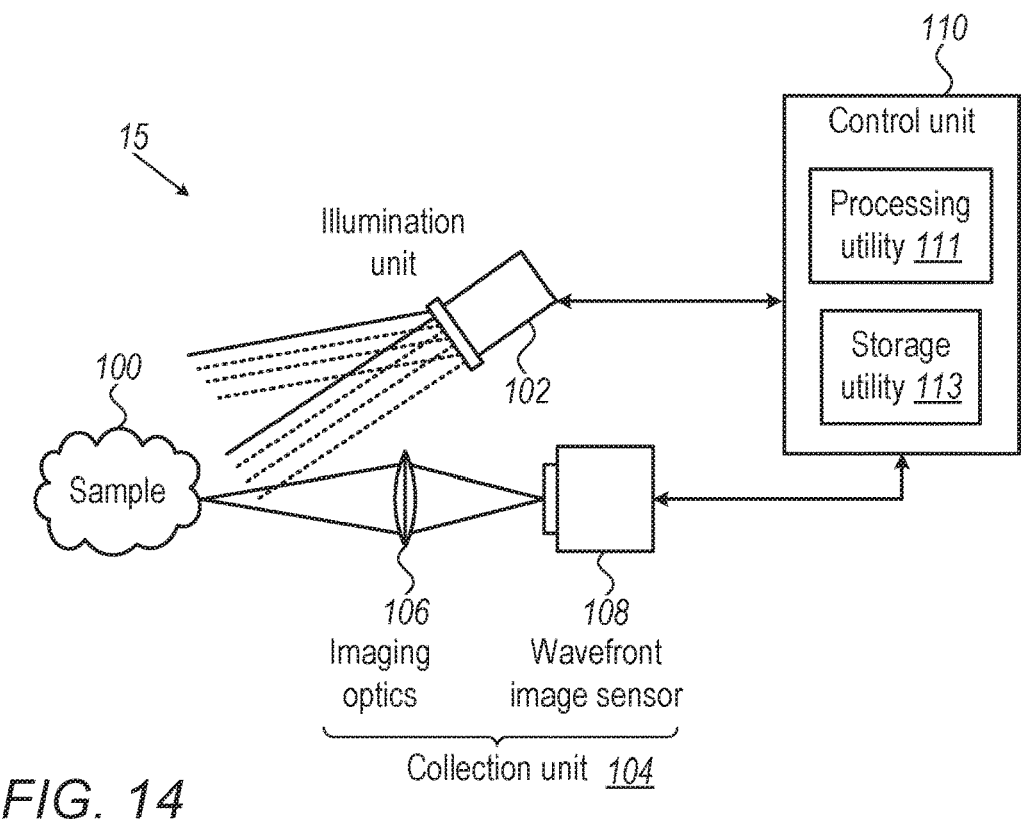
FIG. 14 is a block diagram that schematically illustrates a system according to an embodiment of the invention.

FIG. 13 is a block diagram that schematically illustrates a system 13 according to an embodiment of the invention. The same numeral references are used to designate the same elements as in FIGS. 1, 2a-2b, 5a-5b, 6a-6b. System 13 comprises multiple multi-spectral illumination units 103, 105, 107 that can be used to perform multi-spectral diffraction tomography. According to another implementation (not shown in FIG. 13), a moveable illumination unit is used to illuminate the sample 100 from different angles. Another implementation is schematically illustrated in FIG. 14: illumination unit 102 may be adapted to illuminate the sample 100 with variable illumination angle, represented by dashed lines. According to yet another embodiment (not shown in FIGS. 13 and 14), a single illumination unit is moved together with the collection unit 104. According to another embodiment, the sample is moved to thereby create a relative movement with respect to the illumination unit, the collection unit, or both. The invention is not limited by the manner for the creation of multi-angle spectral imaging.

Figure 15:
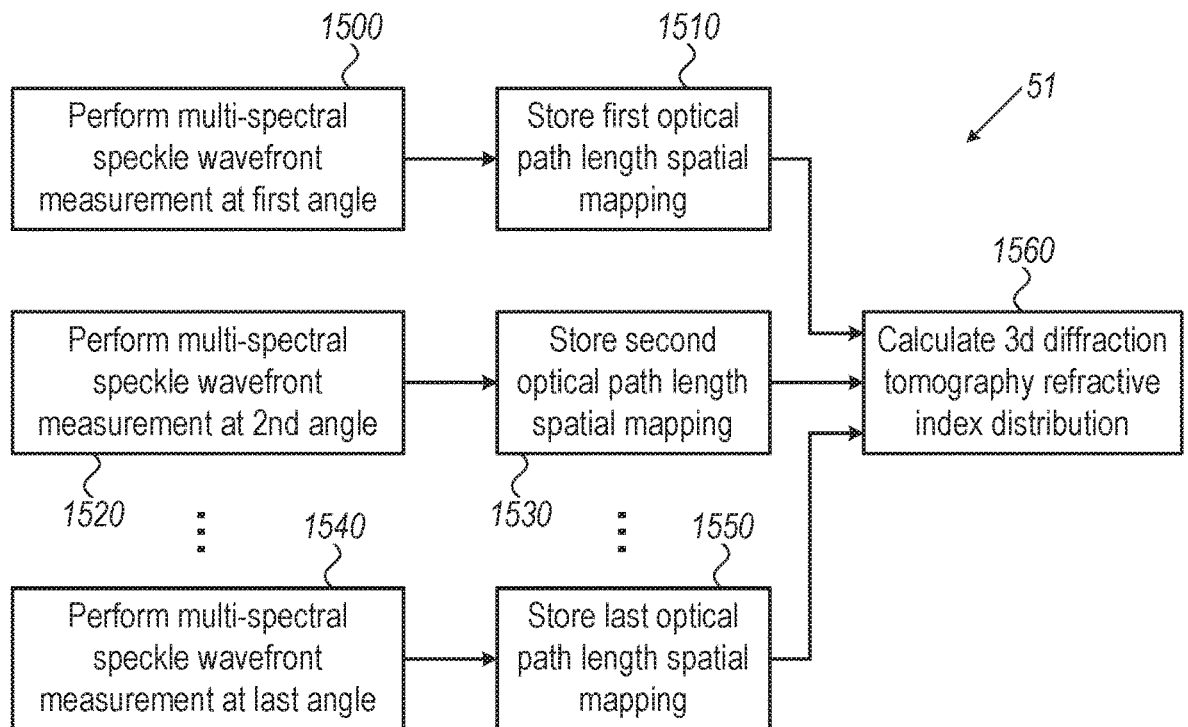
FIG. 15 is a flow diagram that illustrates a method according to an embodiment of the invention.

FIG. 15 is a flow diagram showing flow 51 for performing multi-spectral diffraction tomography. Multi-spectral speckle wavefront imaging is performed at a first illumination angle (operation 1500), and the corresponding spatial optical path length mapping is calculated and stored (operation 1510). The same operations are repeated for all other illumination angles. This is represented in FIG. 15 in operations 1520, 1530, and the three dots followed by operations 1540 and 1550. As a result, a set of spatial optical path length mappings is obtained. In operation 1560, the set of spatial optical path length mappings is used to estimate the 3D structure of the sample using tomographic techniques such as the inverse Radon transform. Note the technique is applicable both in transmission through the sample as well as in reflection.

Figure 16:
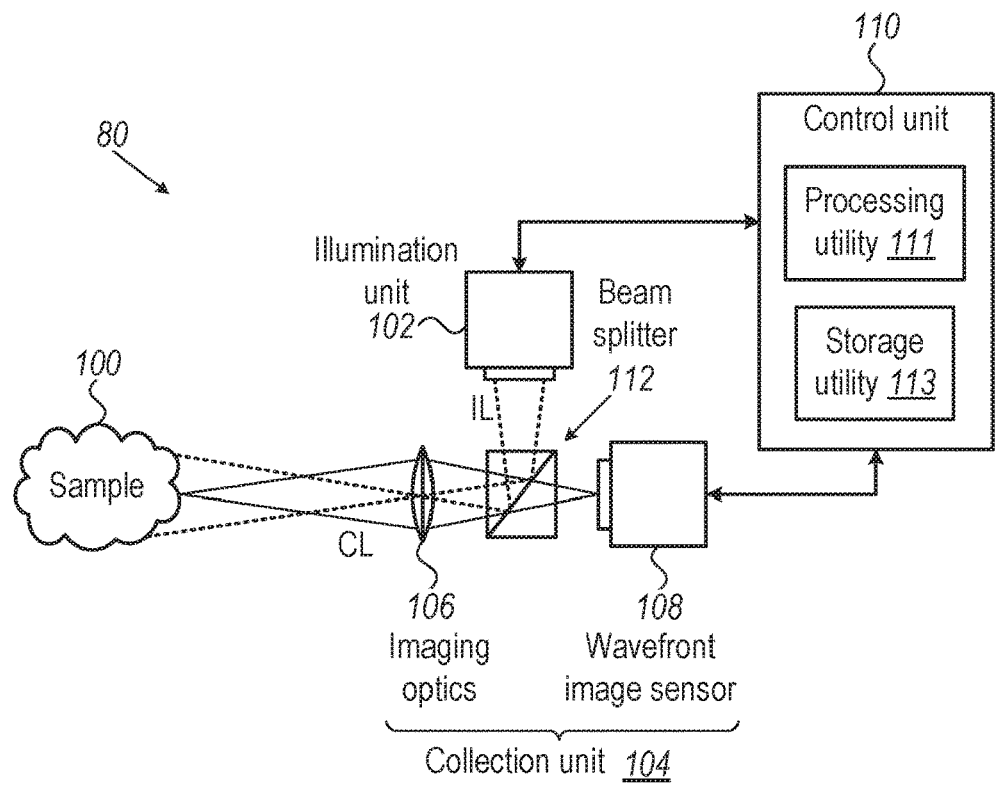
FIG. 16 is a block diagram that schematically illustrates a system according to an embodiment of the invention.

In all the above discussions of the various embodiments of the invention, the illumination unit was treated as separate from the collection unit's optics. However, in some cases, it can be advantageous to use an illumination unit that projects light through the imaging optics onto the sample. This can be realized, for example, as schematically illustrated in FIG. 16. For ease of explanation, we will discuss the embodiment of FIG. 16 in comparison to the embodiment of FIG. 1: system 80 of FIG. 16 differs from system 10 of FIG. 1 by having a beam-splitter arrangement 112. Beam-splitter arrangement 112 is located, in the illumination path, between the illumination unit 102 and imaging optics 106. The illumination IL (dashed lines) comes out of the illumination unit 102, passes through the beam-splitter arrangement 112 and imaging optics 106, and impinges onto the sample 100. In the collection path, beam-splitter arrangement 112 is located between the imaging optics 106 and the wavefront imaging sensor 108. Light CL reflected from the sample 100 or transmitted therethrough, passes through the imaging optics 106 and beam-splitter arrangement 112 and then arrives at the wavefront imaging sensor 108. Without loss of generality, in other embodiments of the invention, the beam-splitter arrangement 112 can be placed in front of the imaging optics 106 (not shown). Finally, in any arrangement of the beam-splitter, care should be taken to ensure that the conditions for the formation of primary and secondary speckles are maintained, as previously described in the relations regarding longitudinal and spatial coherence. The latter previously described relationship between the spatial coherence of the illumination and collection paths (depicted in FIGS. 1, 5a, and 5b) should also be maintained in any type of beam-splitter arrangement.

Beam splitter arrangements can be integrated with other embodiments of the invention, for example, as shown in FIGS. 2a-2b, 5a-5b, 6a-6b, 13, and 14, with the appropriate modifications and alterations, without departing from the scope or spirit of the invention.

The wavefront imaging sensor may be spectrally sensitive. Spectral sensitivity can be achieved in several ways, for example: (1) by using a color-filter-array on the sensor pixels such as an RGB (Red Green Blue) Bayer filter or other types of patterns; (2) by using spectral filters; or (3) by using dichroic prisms with separate sensor pixel arrays for each spectral channel. The invention is not limited by the manner for achieving spectral sensitivity.

The spectral sensitivity of the wavefront imaging sensor may be used to obtain color or hyper-spectral 2D images when used under incoherent lighting conditions. Note that such a spectrally sensitive wavefront imaging sensor can still be used for capturing the speckle wavefront under coherent illumination as long as one ensures that the illuminator's wavelength falls within one of the sensor's spectral sensitivity ranges.

In addition, the sensor's above-mentioned spectral sensitivity may be used to perform simultaneous capture of multi-spectral speckle wavefront images for several wavelength ranges. This simultaneous capture can replace the sequential capture of multi-spectral speckle wavefront images with different illumination wavelengths as previously described. This type of simultaneous multi-spectral image capture can shorten image acquisition time, which may be beneficial in terms of increasing system throughput or reducing sensitivity to sample movement during the multi-spectral wavefront image capture sequence.

Without loss of generality, simultaneous capture of multi-spectral speckle wavefront images using a spectrally sensitive wavefront imaging sensor can also be used in conjunction with sequential capture of spectral wavefront images. An illumination source with selective wavelength ranges can be used. For example, the sample may be illuminated with several wavelengths simultaneously—each wavelength is spectrally separated by the wavefront image sensor. The sample may be illuminated with several different wavelengths so that each is also spectrally separated at the wavefront image sensor.

According to embodiments of the invention, wavefront imaging sensor 108 is structured as the optical detection system described in PCT Patent Application Publication No. WO2018/185740, which is incorporated herein by reference.

Figure 17:
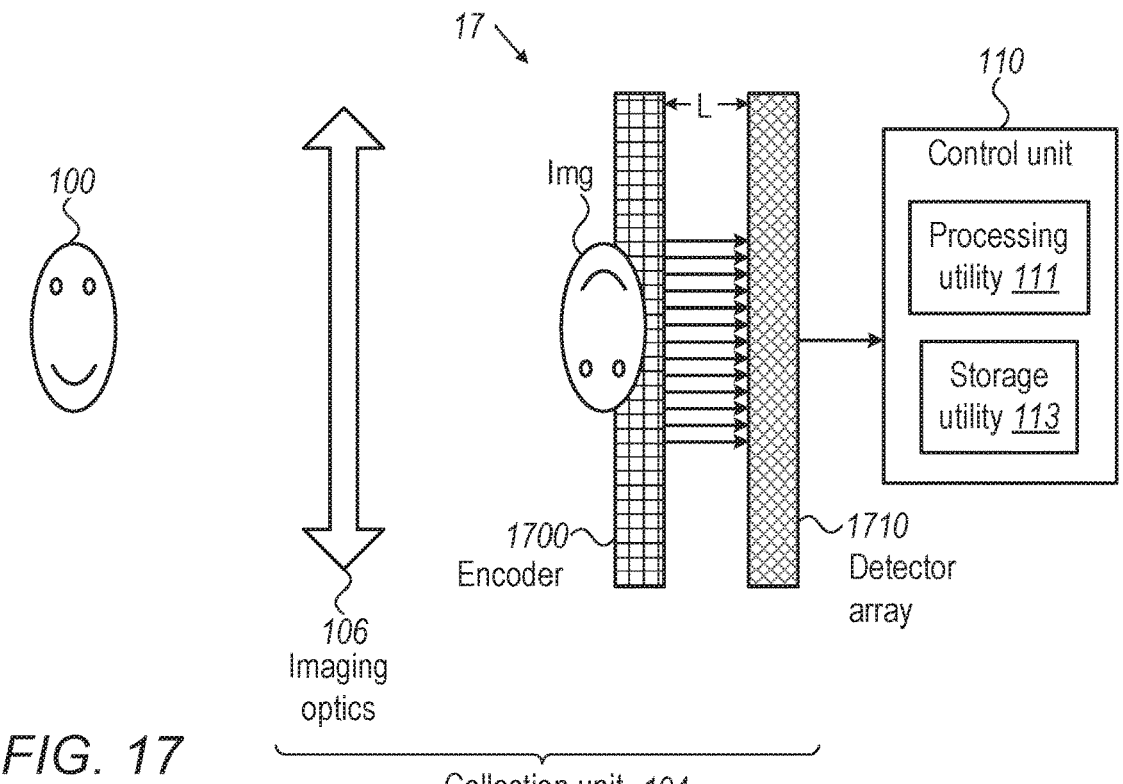
FIG. 17 is a block diagram that schematically illustrates a wavefront imaging sensor and a system according to an embodiment of the invention.

FIG. 17 schematically illustrates a part of a system according to embodiments of the invention, wherein wavefront imaging sensor 17 includes an encoder 1700 and a detector array 1710 located at a predetermined distance L downstream of the encoder 1700 with respect to the general direction of radiation propagation. For ease of explanation, wavefront imaging sensor 17 is shown with other parts of collection unit 104—imaging optics 106 is shown; sample 100 and its image Img onto encoder 1700 are shown. Wavefront imaging sensor 17 is further coupled to the control unit 110.

The encoder 1700 may be realized as (1) a separate unit from the detector array 1710; (2) monolithically integrated with the detector array 1710; or (3) be part of a process stack used to manufacture the sensor array, e.g., using metallization process steps, and/or process steps similar to those used in manufacturing micro-lens arrays typically used to improve pixel fill-factors in sensor arrays.

Wavefront imaging sensor 17 may comprise an encoder 1700 having a periodic pattern defining a plurality of unit cells (not shown in FIG. 17), an array 1710 of sensor cells (not shown in FIG. 17) located at a distance downstream of the unit cells with respect to a general direction of propagation of input light through the system. The wavefront imaging sensor 17 is coupled to control unit 110 configured to receive input data collected by the array 1710 of sensor cells and to process the input data in accordance with data about modulation function of the encoder 1700 to determine data indicative of mutual coherence of input light collected by the encoder 1700.

The array 1710 of sensor cells may define a plurality of sub-array unit cells (not shown in FIG. 17), each sub-array unit cell corresponding to a unit cell of the plurality of the unit cells of the encoder 1700, and each sub-array unit cell comprising a predetermined number M of sensor elements (not shown in FIG. 17).

The encoder 1700 may define a detection plane and is configured to apply predetermined modulation to input light collected by the optical imaging system, wherein the predetermined modulation provides that each unit cell of encoder 1700 directs a portion of the collected input light incident thereon onto a sub-array unit cell of the array 1710 corresponding therewith and onto one or more neighboring sub-array unit cells within a predetermined proximity region.

The predetermined number M may be determined in accordance with a predetermined number of sub-arrays unit cells of array 1710 within the predetermined proximity region.

The predetermined number M of sensor elements of the sub-array unit cells of array 1710 may be selected to satisfy a condition that $(M \geq 2n_R+1)$, where $n_R$ is the predetermined number of neighboring sub-arrays unit cells within the predetermined proximity region.

The predetermined number M of sensor elements of the sub-array unit cells of array 1710 may be selected in accordance with a predetermined number of coherence matrix basis functions selected for use in the reconstruction of mutual coherence information of the collected input field.

The arrangement of the unit cells of the encoder 1700 may define a discretized unit measure of the collected light, such that each unit cell of the encoder 1700 relates to a pixel of image data generated by the wavefront imaging sensor 17.

The physical dimension of the unit cells of the encoder 1700 may correspond to a diffraction-limited spot of collected light incident on the encoder. For example, the physical dimension of the unit cells of the encoder 1700 may be in a range of 0.1-0.25 of the diffraction-limited spot.

The encoder 1700 may be configured for collecting and encoding light of one or more selected wavelength ranges.

The encoder 1700 may be configured to apply predetermined modulation to input light within a predetermined wavelength range.

The array 1710 of sensor cells may comprise sensor cells configured for detecting light intensity of two or more wavelength ranges separately.

Figure 18:
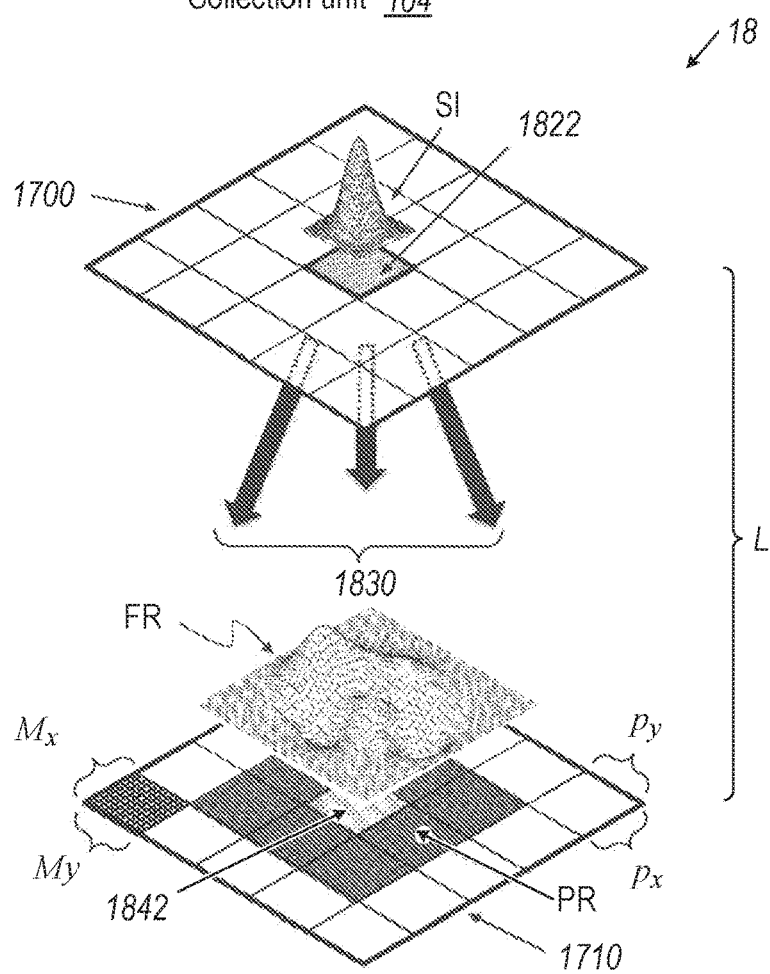
FIG. 18 exemplifies an aspect of a wavefront imaging sensor according to an embodiment of the invention.

FIG. 18 illustrates an aspect of the wavefront imaging sensor 17 of FIG. 17. FIG. 18 depicts encoder 1700 and detector array 1710. FIG. 18 further depicts input light SI transmitted through the single unit cell 1822 of the encoder 1700 with pitch p and propagating a distance L toward the detector array 1710.

A fundamental response function FR is formed that may be detected (in intensity detection) by the detector array 1710. For ease of explanation, a two-dimensional configuration of the fundamental response function FR is shown. The fundamental response function FR relates to complex data (amplitude and phase) of light field propagating downstream of the encoder 1700 and resulting from an impulse light field (e.g., in the form of a diffraction-limited spot excitation of the imaging system 106, or a Gaussian, rectangular, or delta function-like) impinging on a unit cell of the encoder 1700.

Generally, light passage through a region of the encoder 1700 associated with a single unit cell 1822, and the fundamental response thereof may be used for processing the intensity distribution data collected by the wavefront imaging sensor 18. As shown, input light field SI directed onto a single unit cell 1822 of the encoder undergoes predetermined light modulation and propagates through sub-channels 1830 toward the detector array 1710.

Generally, the modulation provided by a single unit cell 1822 is continuous, providing a substantially continuous fundamental response function FR. However, arrows marking five sub-channels (D−2 to D+2) are illustrated for completeness. As described above, these sub-channels can be treated as discrete diffraction orders, which typically result from the periodicity of the encoder 1700. As previously stated, a certain encoder unit-cell 1822 transmits light through sub-channels 1830 to a number of detector sub-arrays within the proximity region PR. This relation is equivalent to the dual statement that a single sub-array 1842 associated with a single unit cell 1822 receives light impinging on it through appropriate sub-channels 1830 from neighboring encoder unit-cells, also defined in an analogous proximity region.

As indicated above, the number of sensor cells M in sub-arrays 1842 or the detector array 1840 associated with the different unit cells of the encoder 1700 may be selected in accordance with the patterning of the encoder and the number of sub-channels transmitting light components from the unit cell 1822 to the sub-arrays 1842 within a certain proximity region PR.

Additionally, the number M of sensor cells may be selected in accordance with selected basis reconstructions, enabling effective reconstruction of phase or coherence mapping of collected light with a reduced number of sensor cells.

In general, the fundamental response function FR falls off to negligible values outside the proximity region PR. For example, the pattern of the encoder 1700 may be configured to provide interaction of collected light with light components associated with one, two, or more neighboring unit cells, e.g., defining nearest neighbors' interaction, next-nearest neighbors, etc. Further, the level of neighbors' interaction may be different for the different transverse axes (x and y) of the wavefront imaging sensor 17.

Generally, the number M of sensor cell associated with each unit cell 1822 is selected to be no less than $M \geq 2n_R+1$, where $n_R$ is the total number of neighboring unit cells in the proximity region PR. $n_R$ is the number of all of the neighboring unit cell interactions with respect to a given unit cell, but with each interaction counted only once. However, as indicated above, in some configurations, the number M of sensor cells may be reduced in accordance with a number of basis functions used for reconstruction of the collecting field. For example, if the optical encoder 1700 is configured to create interactions between a unit cell and its nearest neighbor to its right and its nearest neighbor above it, then $n_R=2$. This specific unit-cell will also have interactions with the unit cells to its left and below it. However, these interactions are counted as belonging to the respective neighboring unit cells to the left and below so as to not count the interactions twice. In the case where the proximity region is separable to interactions along the x and y axes, then $M \geq (2n_{xR}+1)(2n_{yR}+1)$, where $n_{xR}$ is the number of neighboring unit cell interactions along the x-axis, and $n_{yR}$ is the number of neighboring unit cell interactions along the y axis. As before, the number of interactions $n_{xR}$ and $n_{yR}$ are counted in a single-sided fashion so that no interaction is counted twice.

Embodiments of the invention as described herein provide optical, speckle-based imaging systems and corresponding methods for determining data indicative of intensity, phase, and coherence of collected light.

It will thus be appreciated that the embodiments described above are cited by way of example and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

Those skilled in the art will readily appreciate that various modifications and changes can be applied to the embodiments of the invention as hereinbefore described without departing from its scope defined in and by the appended claims.

We claim:

1. An optical, speckle-based imaging system, comprising:
an illumination unit comprising at least one coherent light source having a spatial coherence length and adapted to illuminate a sample;
a collection unit for collecting input light from the sample, the collection unit including an imaging system and a wavefront imaging sensor, the collection unit having a spatial coherence length of a point-spread-function; and
a controller coupled to the illumination unit and the collection unit for analyzing the input light and generating a speckle wavefront image;
wherein the at least one coherent light source is to generate primary speckles in the sample or thereon, and the imaging system is to capture a secondary speckle pattern induced by the illumination unit in the sample or thereon;
wherein the at least one coherent light source has a temporal coherence length which is greater than at least one of (1) an optical diffusion length of the sample or (2) surface roughness of the sample; and
wherein the spatial coherence length of the coherent light source, as projected onto the sample, is greater than the spatial coherence length of the point-spread-function of the collection unit as projected through the imaging system onto the sample.

2. The optical, speckle-based imaging system of claim 1, wherein an exit pupil of the illumination unit is smaller than an entrance pupil of the imaging system, said controller is adapted to affect at least one of a size of the exit pupil, size of the entrance pupil, or a relationship therebetween.

3. The optical, speckle-based imaging system of claim 1, wherein optical properties of the illumination unit and optical properties of the collection unit are selected to form an angle subtended by an optical aperture of the collection unit as seen from an arbitrary point on the sample that is larger than an angle subtended by an optical aperture of the illumination unit as seen from the same point on the sample, for every point to be imaged on the sample.

4. The optical, speckle-based imaging system of claim 1, wherein the illumination unit has an illumination aperture to subtend an illumination angle, and the collection unit has a collection aperture to subtend a collection angle and wherein the controller is further coupled to the illumination unit to affect optical properties of illumination and is further to affect optical properties of light collection to form the collection angle, as seen from an arbitrary point on the sample, to be larger than the illumination angle as seen from the same point on the sample, for every point on the sample to be imaged.

5. The optical, speckle-based imaging system of claim 1, wherein the collection unit is to measure data indicative of at least one of speckle intensity, speckle wavefront, and speckle coherence.

6. The optical, speckle-based imaging system of claim 1, wherein the illumination unit further comprises an incoherent light source and the controller is configured to operate the illumination unit to selectively provide a coherent light and an incoherent light, said controller is further configured to generate a light field image in response to incoherent illumination.

7. The optical, speckle-based imaging system of claim 1, wherein the illumination unit further comprises an incoherent light source and wherein the controller is to operate an aperture of the illumination unit so that a spatial coherence length of the incoherent light is shorter than a spatial coherence length of the imaging system of the collection unit.

8. The optical, speckle-based imaging system of claim 1 wherein the wavefront imaging sensor is one member of a group consisting of: a plenoptic camera; a Shack-Hartmann wavefront sensor; and a coherence camera wavefront sensor comprising an encoder having a plurality of equal unit cells, and an array of sensor cells located at a distance downstream of said unit cells with respect to a general direction of propagation of input light through the wavefront imaging sensor, wherein the array of sensor cells defines a plurality of sub-array unit cells, each sub-array corresponding to a unit cell of said plurality of the unit cells of the encoder, and each sub-array comprising a predetermined number M of sensor elements, and wherein the encoder is to apply predetermined modulation to input light such that each unit cell of said encoder directs a portion of the input light incident thereon onto sub-array unit cell corresponding therewith and one or more neighboring sub-array unit cells within a predetermined proximity region, and wherein the predetermined number M is determined in accordance with a predetermined number of sub-arrays unit cells within the predetermined proximity region.

9. The optical, speckle-based imaging system of claim 1 wherein: the illumination unit is to provide at least one light of a group consisting of: coherent light, partially coherent light, and incoherent light; the illumination unit is further to provide light as a set of varying optical properties, the optical properties are from a group consisting of: selected wavelength ranges, selected temporal coherence ranges, selected illumination directions; and the controller is to generate one or more of a group consisting of: intensity map, wavefront map, and coherence map.

10. An optical, speckle-based imaging system, comprising:
an illumination unit comprising at least one coherent light source having a spatial coherence length and adapted to illuminate a sample;
a collection unit for collecting input light from the sample, the collection unit including an imaging system and a wavefront imaging sensor, the collection unit having a spatial coherence length of a point-spread-function; and
a controller coupled to the illumination unit and the collection unit for analyzing the input light and generating a speckle wavefront image;
wherein the at least one coherent light source is to generate primary speckles in the sample or thereon, and the imaging system is to capture a secondary speckle pattern induced by the illumination unit in the sample or thereon;
wherein the illumination unit has an illumination aperture to subtend an illumination angle, and the collection unit has a collection aperture to subtend a collection angle and wherein the controller is further coupled to the illumination unit to affect optical properties of illumination and is further to affect optical properties of light collection to form the collection angle, as seen from an arbitrary point on the sample, to be larger than the illumination angle as seen from the same point on the sample, for every point on the sample to be imaged; and
wherein the spatial coherence length of the coherent light source, as projected onto the sample, is greater than the spatial coherence length of the point-spread-function of the collection unit as projected through the imaging system onto the sample.

11. An imaging method, comprising:
illuminating a sample with coherent light from at least one coherent light source;
capturing input light coming from the sample by a collection unit including imaging system and a wavefront imaging sensor;
by a controller coupled to the collection unit, analyzing the input light and generating a speckle wavefront image, wherein the at least one coherent light source is to generate primary speckles in the sample or thereon, and the imaging system is to capture a secondary speckle pattern induced by illuminating the sample or thereon;
illuminating a face or part thereof with at least one of spatially incoherent light and ambient light; capturing incoherent wavefront image; calculating a two-dimensional (2D) intensity image and depth map; extracting unique three-dimensional (3D) facial recognition data;
comparing the facial recognition data with stored unique three-dimensional (3D) sample recognition data; and
determining a recognition accept or reject decision.

12. The imaging method of claim 11 further comprising: repeating the operations of illuminating, capturing, analyzing, and generating for a sequence of wavelengths; performing multi-spectral phase unwrapping; and estimating a surface profile.

13. The imaging method of claim 11 wherein a size of an exit pupil of an illumination unit includes said at least one coherent light source is smaller than a size of an entrance pupil of the imaging system.

14. The imaging method of claim 13, further comprising capturing and analyzing at least one additional input light coming from the sample and generating at least one additional speckle wavefront image, and calculating sample deformation based on the speckle wavefront image and the at least one additional speckle wavefront image.

15. The imaging method of claim 14 wherein calculating sample deformation is performed by determining a change in local tilt between one or more pairs of speckle wavefront images.

16. The imaging method of claim 15 further comprising calculating a time-sequence of spatio-temporal deformation maps.

17. The imaging method of claim 16 further comprising at least one step of a group consisting of: analyzing the time-sequence of spatio-temporal deformation maps and picking out specific regions of interest in the sample; analyzing the time-sequence of spatio-temporal deformation maps and differentiating between the sample and sample surroundings; analyzing the time-sequence of spatio-temporal deformation maps and differentiating between an overall movement of the sample and local deformations or vibrations; analyzing the time-sequence of spatio-temporal deformation maps and performing spatial segmentation; analyzing the time-sequence of spatio-temporal deformation maps and performing temporal segmentation; analyzing the time-sequence of spatio-temporal deformation maps and extracting an acoustic signal; analyzing the time-sequence of spatio-temporal deformation maps and measuring biometric parameters; analyzing the time-sequence of spatio-temporal deformation maps and mapping mechanical vibration modes.

18. The imaging method of claim 16 further comprising: analyzing the time-sequence of spatio-temporal deformation maps and extracting spatio-temporal biometric parameters; extracting unique biomarkers; comparing the unique biomarkers with stored unique biomarkers; and determining a recognition accept or reject decision.

* * * * *